(12) United States Patent
Marino et al.

(10) Patent No.: US 8,646,966 B2
(45) Date of Patent: Feb. 11, 2014

(54) DISPOSABLE SHAKER

(75) Inventors: Roberto Marino, Cusano Milanino (IT);
Egidio Renna, Napoli (IT)

(73) Assignee: Club Seven S.r.l., Milan (IT)

( * ) Notice: Subject to any disclaimer, the term of this patent is extended or adjusted under 35 U.S.C. 154(b) by 930 days.

(21) Appl. No.: 12/785,518

(22) Filed: May 24, 2010

(65) Prior Publication Data

US 2011/0180545 A1 Jul. 28, 2011

(30) Foreign Application Priority Data

Jan. 25, 2010 (IT) .............................. CO2010A0002

(51) Int. Cl.
*A47J 43/27* (2006.01)

(52) U.S. Cl.
USPC ....... 366/130; 206/222; 215/DIG. 8; 220/568

(58) Field of Classification Search
USPC ............. 366/130; 206/219–222; 215/DIG. 8; 220/568; 241/168, 169, 169.2, 274, 241/DIG. 17
See application file for complete search history.

(56) References Cited

U.S. PATENT DOCUMENTS

| | | | | |
|---|---|---|---|---|
| 3,240,391 | A * | 3/1966 | Garton | 222/80 |
| 3,339,802 | A * | 9/1967 | Weiner et al. | 222/82 |
| 3,347,410 | A * | 10/1967 | Schwartzman | 222/80 |
| 3,349,966 | A * | 10/1967 | Schwartzman | 222/80 |
| 3,521,745 | A * | 7/1970 | Schwartzman | 206/222 |
| 3,548,562 | A * | 12/1970 | Schwartzman | 53/440 |
| 4,103,772 | A * | 8/1978 | Wiegner | 206/222 |
| 4,174,035 | A * | 11/1979 | Wiegner | 206/222 |
| 4,193,698 | A * | 3/1980 | Gartner | 366/130 |
| 4,408,690 | A * | 10/1983 | Ferrero | 206/222 |
| 5,273,190 | A * | 12/1993 | Lund | 222/83 |
| 5,419,429 | A * | 5/1995 | Zimmerman et al. | 206/222 |
| 5,586,676 | A * | 12/1996 | Lynd | 220/212 |
| 6,726,005 | B2 * | 4/2004 | Lentine | 206/222 |
| 7,192,179 | B2 * | 3/2007 | Angeletta | 366/130 |
| 7,216,761 | B2 * | 5/2007 | de Vries | 206/222 |
| 7,959,346 | B2 * | 6/2011 | Loden | 366/130 |

(Continued)

FOREIGN PATENT DOCUMENTS

| | | |
|---|---|---|
| DE | 10323608 A1 | 12/2004 |
| WO | WO 9222237 A1 * 12/1992 | ............. A47J 43/27 |
| WO | 2009104099 A2 | 8/2009 |

OTHER PUBLICATIONS

Search Report, dated Jun. 17, 2010 in IO12511/ITCO2010002.

*Primary Examiner* — Charles E Cooley
(74) *Attorney, Agent, or Firm* — Young & Thompson

(57) ABSTRACT

A disposable shaker has an upper cover part having a multi-compartment with compartments closed by a membrane and containing components of the desired cocktail and having a lower cup part rotatingly associated to the cover part with teeth for tearing the membrane. The separation walls forming the compartments are obtained as substantially U-shaped hollow walls, opening outwards and having the transverse side of the U-shape forming the surface for fixing the membrane. Along the longitudinal axis of the multi-compartment the separation walls are joined in a single piece with an axial duct which is extended along the multi-compartment. Also provided for is an element suitable to guarantee proper positioning between the cover part and the cup part in the assembled position, and elastic locking elements preventing the shaker from opening after preparing the cocktail. The shaker may have an "overturned arrangement" of the internal structures of the cover and cup.

13 Claims, 16 Drawing Sheets

(56) References Cited

U.S. PATENT DOCUMENTS

| | | | |
|---|---|---|---|
| 8,147,120 B2* | 4/2012 | Renna et al. | 366/130 |
| 2003/0047468 A1* | 3/2003 | Lentine | 206/222 |
| 2005/0007871 A1* | 1/2005 | Angeletta | 366/130 |
| 2005/0161466 A1* | 7/2005 | McGlothlin et al. | 222/1 |
| 2007/0211563 A1* | 9/2007 | De Vries | 366/139 |
| 2007/0246381 A1* | 10/2007 | Pond | 206/222 |
| 2010/0206174 A1* | 8/2010 | Loden | 99/275 |
| 2010/0258457 A1* | 10/2010 | Seelhofer | 206/222 |
| 2010/0315897 A1* | 12/2010 | Renna et al. | 366/130 |
| 2011/0180545 A1* | 7/2011 | Marino et al. | 220/568 |
| 2011/0272302 A1* | 11/2011 | Pagan | 206/222 |

* cited by examiner

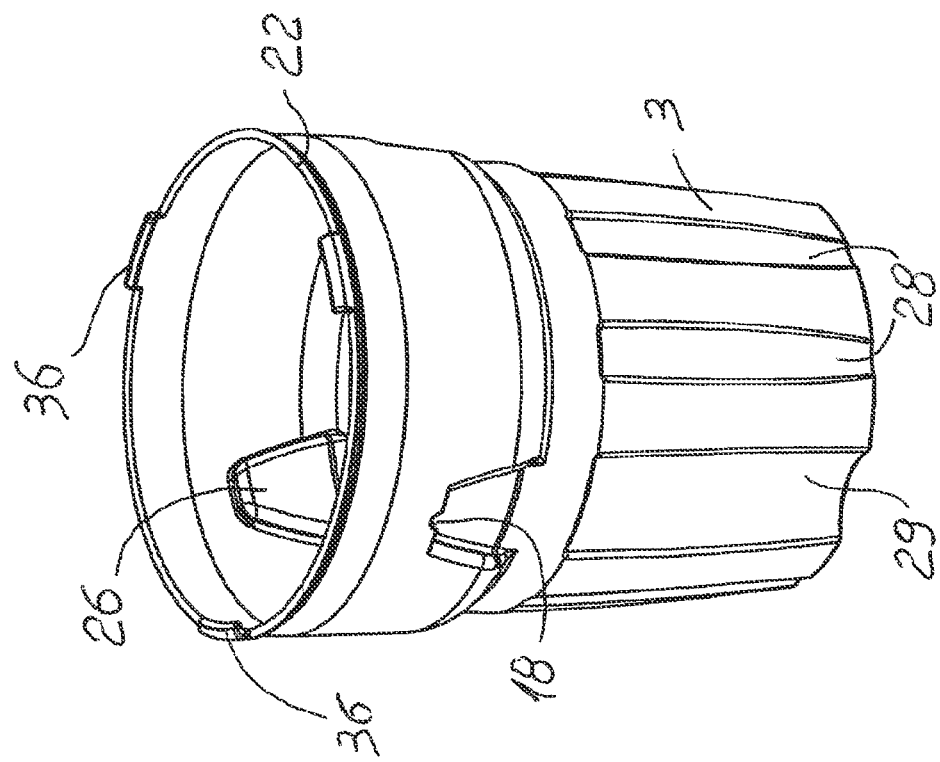
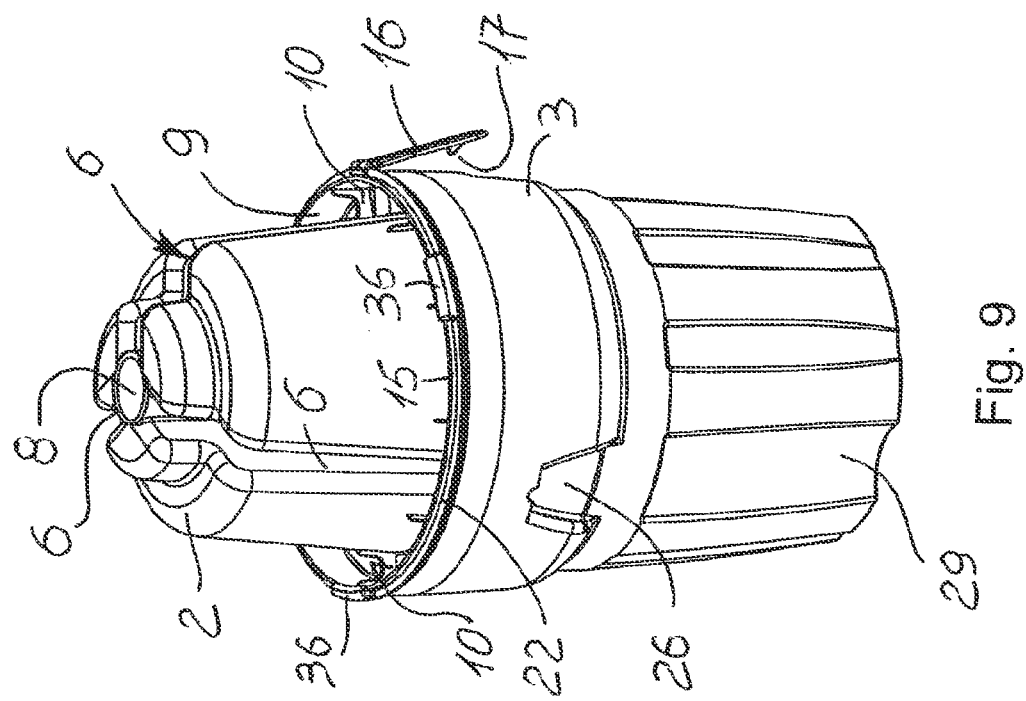

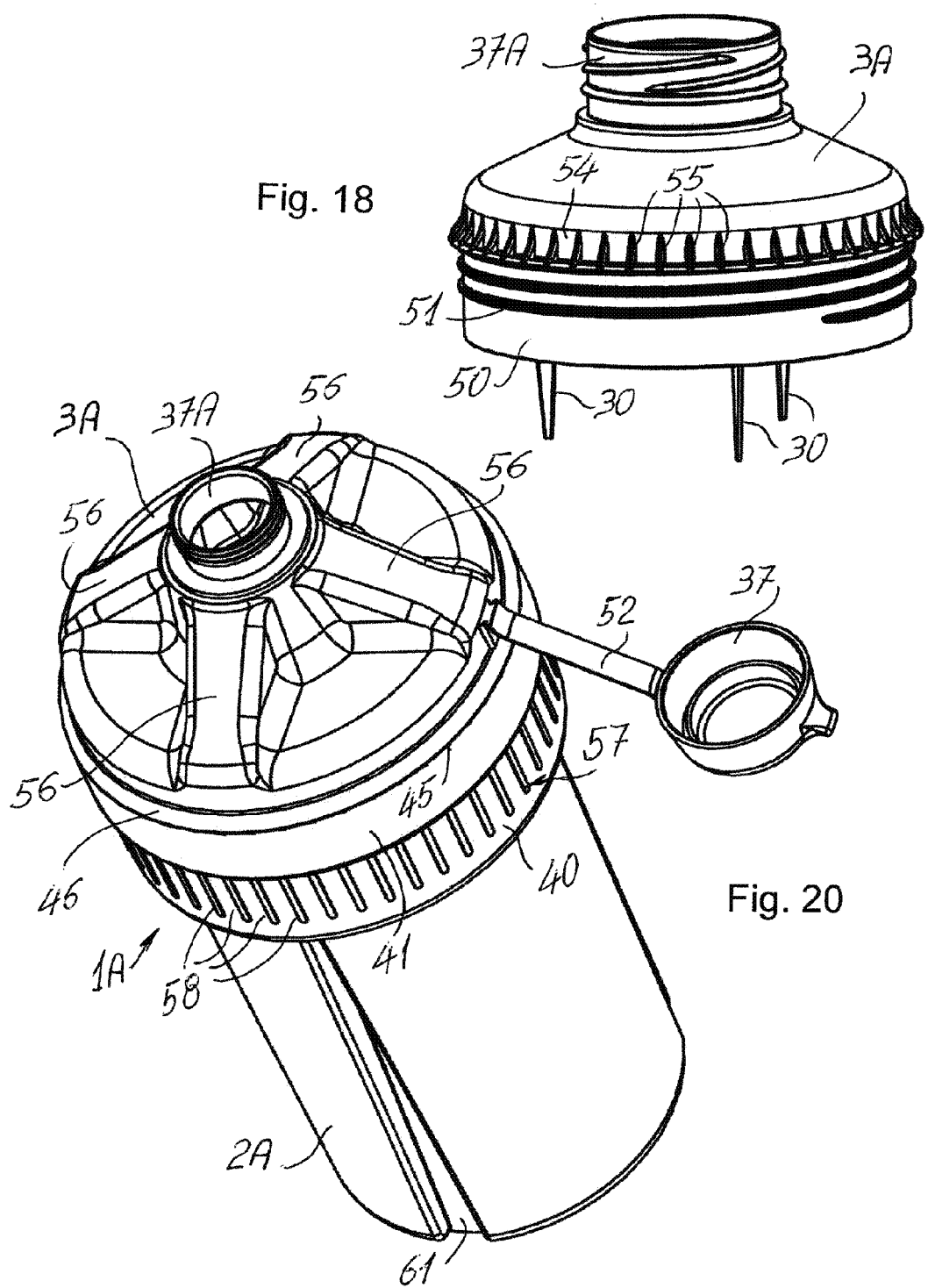

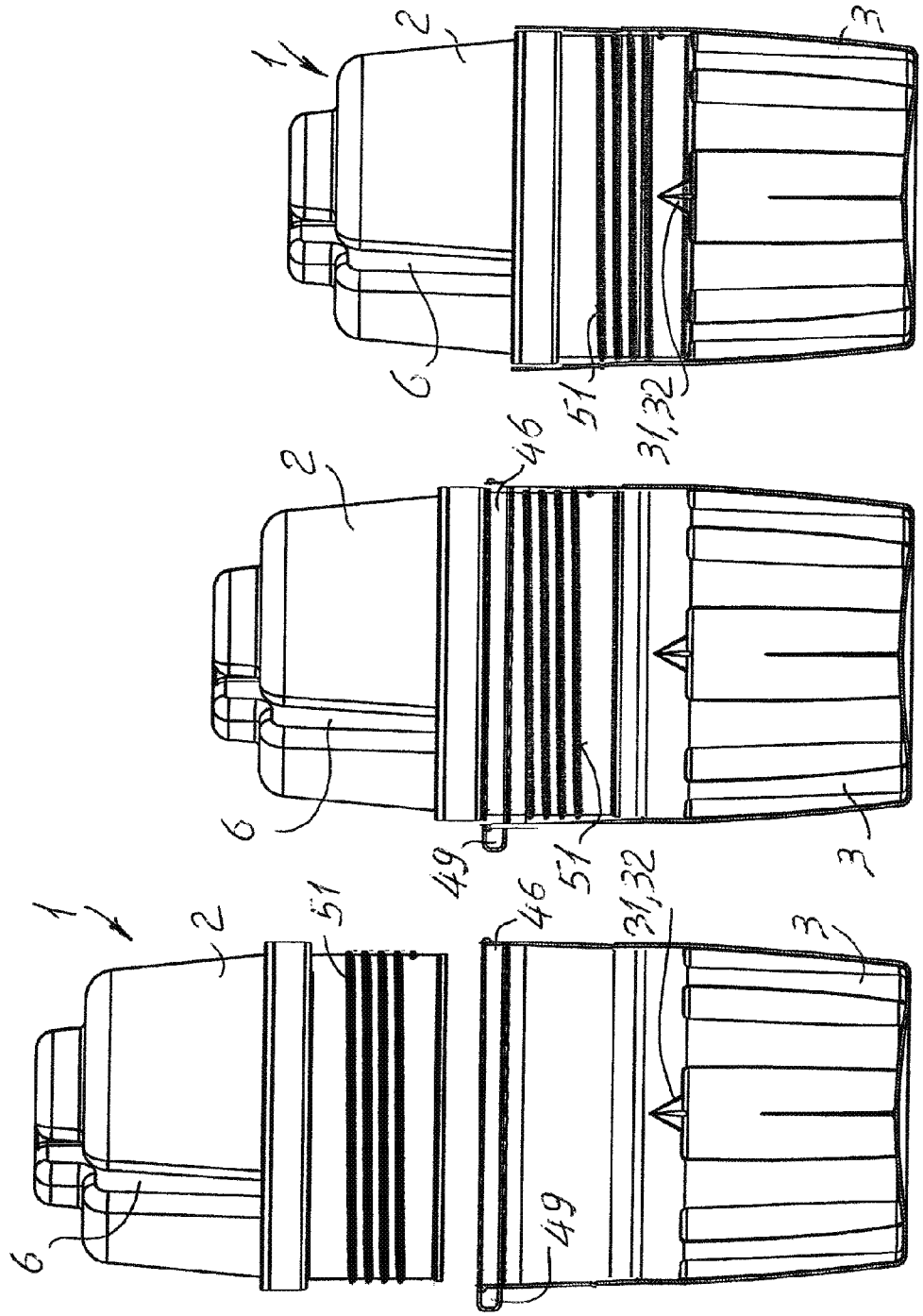

DISPOSABLE SHAKER

DESCRIPTION OF THE INVENTION

1. Field of Application

The present invention refers to improved disposable shakers.

2. Technological Background and State of the Art

Disposable shakers provided for preparing single cocktails are known in different embodiments and substantially consisting in containers made of several parts, containing the components of the cocktail provided for from time to time in compartments closed by a membrane—being provided with tearing teeth suitable to tear said membrane following a relative movement between parts of the shaker—made using synthetic material.

A first embodiment of a cartridge intended for packaging a cocktail is disclosed in the document FR-A-2 751 860. The cartridge described herein is cylindrical-shaped with several tubular parts arranged axially, i.e. a cover part (A), two intermediate parts (I and K) associated to a disc with tearing duct s facing towards the cover, as well as a mixing cup part (L), having a chamber (M) for a piece of ice as well as a mixing element (R), wherein accommodated between the intermediate piece (I) and the cover (A) is a group (E) formed by cartridges each containing an ingredient of the cocktail provided for, closed at the ends by means of the membrane (F and G) and containing an eccentric duct (O) having a lower end fixed against the disc (H) and projecting with the other end from the cover (A) for pouring the cocktail obtained. The cover (A) in turn has an upper part with tearing ducts (C) projecting downwards and, peripherally, an opening (B) for the passage of air. The group formed by the cartridges (E) and by the through duct (O) can be closed by an openable ring (J). In practice, by axially pressing the cover (A) downwards there occurs the tearing of the upper (F) and lower (G) membranes of the cartridges (E) and, the air flowing in through the opening (B) allows releasing the components of the cocktail into the mixing cup-like base part (L), wherein after the mixing, cooled by the piece of ice, the cocktail may be poured out through the pouring duct (O), which is closable by means of the cap (P). A straw may be also introduced through said through duct (O).

The description above shows that the shaker disclosed in the document FR-A-2 751 860 has various and serious disadvantages. First and foremost, it requires three parts associable in a sliding manner, as well as the use of a container with several compartments, i.e. with several cartridges, associated to the through duct, as well as a closure ring, alongside the tearing teeth at both ends of the cartridges, with respective openable ring. This implies considerable extension axially with respect to the shaker, as well as an extensive use of synthetic material. A further disadvantage lies in the fact that it requires a high number of moulds as well as a long period of assembly. Another disadvantage lies in the poor exploitation of the inner space of the shaker intended for accommodating the separate liquors, i.e. the components of the cocktail.

The high disproportion in weight between the required synthetic material and the contents of the shaker, i.e. the so-called "overpackaging", would not allow—not even currently—the use of such disposable shaker in various countries, such as for example Great Britain.

The inventors of the present application described in the document WO2009/104099 A2 various embodiments of a disposable shaker, which overcome the abovementioned disadvantages of the shaker illustrated in the document FR-A-2 751 860.

The document WO2009/104099 A2 discloses a preferred embodiment of a disposable shaker, FIGS. 20 to 26, wherein according to the preamble of claim 1 the disposable shaker substantially comprises two parts, i.e. a base cup part (2) and a cover cup part (3) joinable removably with respect to each other, with an axial snap-engagement or with rotating engagement, wherein the cover part (3) accommodates or forms a container with several compartments (9) provided for the accommodation of separate ingredients of the cocktail and closable sealingly by means of a lower membrane (6), wherein further provided for are teeth (7) for tearing the membrane (6) formed solely in the base part (2) with tearing tips adjacent to said membrane (6), in the closed or assembled position of the shaker (1), hence a respective axial and/or rotational movement between the cover (3) and the base (2) determines the penetration of said tearing teeth (7) into the membrane (6), with ensuing tearing of the membrane and transfer of the ingredients of the cocktail into the cup base part (2) of the shaker (1) to obtain the cocktail.

This embodiment requires only two parts and two respective moulds, low use of synthetic material and a very easy manipulation. The latter action is further facilitated by providing for specific guide means when performing the mutual movement between the cover part and the base part.

Now, the inventors have also observed that the disposable shakers described in the embodiment of FIGS. 20 to 26 of the above-mentioned publication WO2009/104099 A2 may be further improved.

The inventors for example observed that the thickness of the walls defining the compartments for the ingredients of the cocktail in the cover part is crucial for a reliable adhesion of the membrane, which is subjected to swelling following the formation of expansion gas released by the components of the cocktail inside said compartments in presence of ambient temperature or storage tending to increase, for example in case of storage of shakers in environments exposed to sunlight or the like. On the other hand, increasing the low thickness provided for these separation walls would lead to serious consequences. First and foremost a considerable increase of the use of material and, at the same time, considerably slowing down production due to the substantial increase of the cooling time, which increases significantly as the thickness of said walls increases.

In addition, it was observed that it was not possible to guarantee a reliable fixed positioning between the cover part and the cup part, in the assembled position of the shaker. As a matter of fact, under pressure from above, the oscillating stop fins start yielding elastically and thus progressively allow the tearing teeth to act on the membrane, thus causing an unwanted early release of the components from their compartments, with ensuing discarding of the shaker, wherein such drawback is referred to as "tear triggering". There are various reasons leading to such "tear triggering". For example, in the logistics when moving the pallets the shakers inside containers stacked over each other could, due to the weight, impacts and knocks thereof, they themselves inadvertently trigger the tearing of the membrane. A similar inadvertent tear triggering of the membrane could occur in shakers arranged in shopping paper bags or bags under heavy packages, cans, bottles and the like.

It was also observed that it would be desirable to have a better stacking, for example of the base or cup parts in such a manner to obtain lower overall dimensions regarding the production machine and higher productivity thereof.

It was also observed that the direction of rotation for tearing the membrane would preferably allow only one direction of rotation, for example clockwise, instead of free rotation clockwise and anticlockwise given that this would lead to problems related to proper manipulation by the user.

In addition, it would be desirable to provide for a conformation, both of the upper cover-shaped or cover part and the lower cup-shaper or cup part suitable for producing these components with thin wall, but still having the suitable rigidity of the shaker, both with the aim of reducing the cooling times, hence increasing the productivity of the machine, and considerably reducing the amount of synthetic material required.

It would also be desirable to simplify the construction of the shaker with the aim of allowing both the use of membranes made of synthetic material and membranes made of aluminium.

Lastly, it would be desirable to provide for a configuration of the shaker allowing the use of a straw even with the shaker closed, i.e. without requiring opening the shaker after preparing the cocktail.

SUMMARY OF THE INVENTION

Thus the inventors undertook the main task of providing disposable shakers capable of overcoming the abovementioned drawbacks, and, simultaneously, of increasing the productivity of the production machine.

The task also includes indicating variants of disposable shakers suitable to obtain the improvements indicated above.

The abovementioned task is solved, according to the present invention, by means of a disposable shaker comprising an upper cover-shaped or cover part and a lower cup-shaped or cup part joinable removably to each other, with axial and rotating engagement, the cover accommodating or forming a multi-compartment or container with several compartments for holding separate ingredients of the cocktail to be prepared and being sealingly closable at the lower part by means of a membrane fixable thereto, wherein provided for in the cup—at the upper part—are teeth for tearing said membrane formed in a single piece with the cup and having tearing tips adjacent to said membrane, in the closed or assembled position of the shaker, hence a respective axial and rotational movement between said cover and said cup first determine a penetration of said tearing teeth into said membrane, and then an ensuing tearing of the same and the release of the ingredients of the cocktail from the cover into the cup for mixing and shaking thereof in the shaker, wherein provided for in the cover and in the cup are mutual support means—in the assembled position—of the shaker, wherein, alternatively, said multi-compartment is provided for in said lower cup part and said tearing teeth are provided for in said upper cover part, characterized in that the separation walls between the compartments of the ingredients of the cocktail are obtained as substantially U-shaped transverse section hollow walls, open outwards and with the bottom transverse side of the U-shape forming the fixing surface of the membrane, wherein along the longitudinal axis of said multi-compartment said separation walls are joined in a single piece with an axial duct which is extended along the height of said multi-compartment.

Furthermore, provided for according to the invention are means for fixed positioning between the cover and the cup of the shaker in the assembled condition. In a preferred embodiment these positioning means are formed by a tab joined in a single piece in a hinge-like manner to the lower edge of the cover, which projects downwards and has—internally—a tooth-like element suitable to be snap-engaged in a seat obtained outside the cup.

According to the invention the means for mutual support in the cover and in the cup in the assembled position of the shaker are formed by robust quadrangular support projections, for example trapezoidal, with rounded corners and distributed on respective overlapped circumferences, with the shaker assembled, which have two functions: on one hand they exclude inadvertently triggering tearing and, on the other hand, they allow correct rotation in the transverse plane of the shaker between the cover and cup before tearing the membrane and also a mutual smooth approaching between the cover and cup for the desired perforation of the membrane, wherein also provided for in the cup—at said support projections—is a U-shaped stiffening outer flange-like groove with radial reinforcement bridges distributed circumferentially in said flange-like groove.

Furthermore, according to the invention, provided for in the cover is an axial strip element suitable to cooperate with an abutment in the cup to prevent mutual rotation in a direction of rotation, for example anticlockwise.

According to the invention, regarding the application of the membranes, made of synthetic material or aluminium, any specific seat is eliminated and a crown is made connecting the bottom sides of the hollow separation walls, such crown having a projecting edge in such a manner to obtain safe adhesion of the membrane up to the outer corner of said crown.

There are two solutions applicable in order to guarantee reliable sealing of the liquid when shaking. One by folding the membrane backwards in such a manner to form a sealing lip against the inner wall of the cup. The other by moulding the cover having a flexible annular lip on the crown.

Though the use of a straw through the abovementioned axial through duct of the cover, closed at the lower part by a sealing membrane, could occur after the tearing of the membrane, the shaking and the opening of the shaker, further provided for according to the invention is an embodiment wherein, after assembling the disposable shaker, the same cannot be opened again, hence the prepared cocktail can only be drank through a straw with the shaker closed. This form of embodiment meets a recently ever-growing tendency consisting in taking drinks solely using the straw.

For such purpose, according to the invention, provided for on the upper edge of the cup is a plurality of hook-like circumferential segments, which, when assembling the cover and the cup first yield elastically and are then repositioned elastically above the edge of the abovementioned U-shaped flange-like groove of the cover and thus prevent a separation between the cover and cup, though allowing the rotational tearing movement of the membrane.

Various advantages are attained by means of the disposable shakers according to the invention. First and foremost it is possible to increase the productivity of the production machine in that the various parts of the shaker are obtained being thin, with ensuing reduction of the cooling times. By providing hollow separation walls for the multi-compartment container, thus having an adhesion surface of the membrane having large dimensions, analogously to the crown joining said separation walls, one attains a definite fixing of the membrane, hence the same is definitely capable of resisting to the pressure increase inside the single compartments due to the production of gases formed by the components of the cocktail upon the increase of the ambient temperature.

Another advantage is to be seen in the accurate maintenance of the position between the cover and cup in the assembled shaker, in that said positioning is obtained through mechanical snap-positioning means separable manually solely to prepare the cocktail.

Providing for relatively long mutual support projections and having rounded corners in the cover and in the cup not only guarantees proper rotating movement between said cover and cup before the perforation of the membrane, but also said support projections contribute to stiffening said cover and cup and, at the same time, exclude the abovementioned triggering of tearing. The cover is also stiffened by means of the abovementioned U-shaped outer annular flange-like groove with stiffening bridges, wherein these solutions and the hollow configuration of the separation walls between the various compartments and the perimeter ribs of the cup contribute to confer both to the cover and cup a considerable rigidity though using a small wall thickness.

A simple axial strip is used in the cover to simply obtain a tearing rotation always in the single desired direction, for example clockwise.

Disposable shakers according to the invention may use membranes made of synthetic material or aluminium indistinctively.

Provided for as tearing teeth are composite teeth, which guarantee the formation of a reliable opening gap when tearing the membrane.

A further advantage of the invention is to be seen in the fact that the disclosures and characteristics of the invention may be used in a very simple manner, i.e. for example by inverting the structures of the cover and cup parts, providing for dimensional values variable between the cover and cup, providing for in the cover an opening closable by a "plug" element for example of the push-pull type, from which the contents of the shaker may be drank, for example at different times, as known for example from "bidons" used by cyclists, and so on.

BRIEF DESCRIPTION OF THE DRAWINGS

Further characteristics, advantages and details of the improved disposable shakers according to the invention are inferable from the following description of two preferred embodiments illustrated for exemplifying purposes in the attached drawings, to which reference shall be made even for possible details not outlined in-depth in the following description.

In the drawings, partly made using computer programmes:

FIG. 5A shows details of the multi-compartment 2B including the several compartments 7 for the cocktail ingredients;

FIG. 9 shows a top oblique perspective view of a second embodiment of the disposable shaker according to the invention, which is different from the first embodiment illustrated in FIGS. 1 to 8 solely due to the presence of locking means in form of hook-like surmounting lips provided for on the upper edge of the lower cup part;

FIG. 10 shows a top oblique perspective view of a cup of the shaker of FIG. 9;

FIG. 18 shows a front view of a first upper cover part having a threaded union or connection for accommodating a cap or plug, for example of the push-pull type or the like, and illustrating the external threading on the cylindrical band of the upper cover part and the tearing teeth;

FIG. 20 shows an oblique top perspective view on the shaker of FIG. 16 with the cap removed;

FIGS. 23, 24 and 25 show, respectively a median vertical section, in the separated position (FIG. 23), in the assembled position (FIG. 24) and in the position of tearing the membrane (FIG. 25), one shaker for the cocktail, beverage or drink substantially of the type indicated in FIGS. 1 to 8 however provided with means for coupling and locking by means of thread coupling and removable spacer band of the type illustrated in FIGS. 16 to 22.

DESCRIPTION OF THE PREFERRED EMBODIMENTS

In the illustrated embodiments, identical or functionally equivalent parts have equal reference numbers, wherein in all illustrated embodiments the shakers are formed by only two components, that is an upper part and a lower part.

Reference is first made to an embodiment illustrated in FIGS. 1 to 8, wherein the shaker according to the invention is indicated in its entirety with 1 and it comprises an upper or cover part 2 and a lower or cup part 3, wherein both the cover 2 and the cup 3 are made of synthetic material by moulding, each in a single piece.

Figure 1:
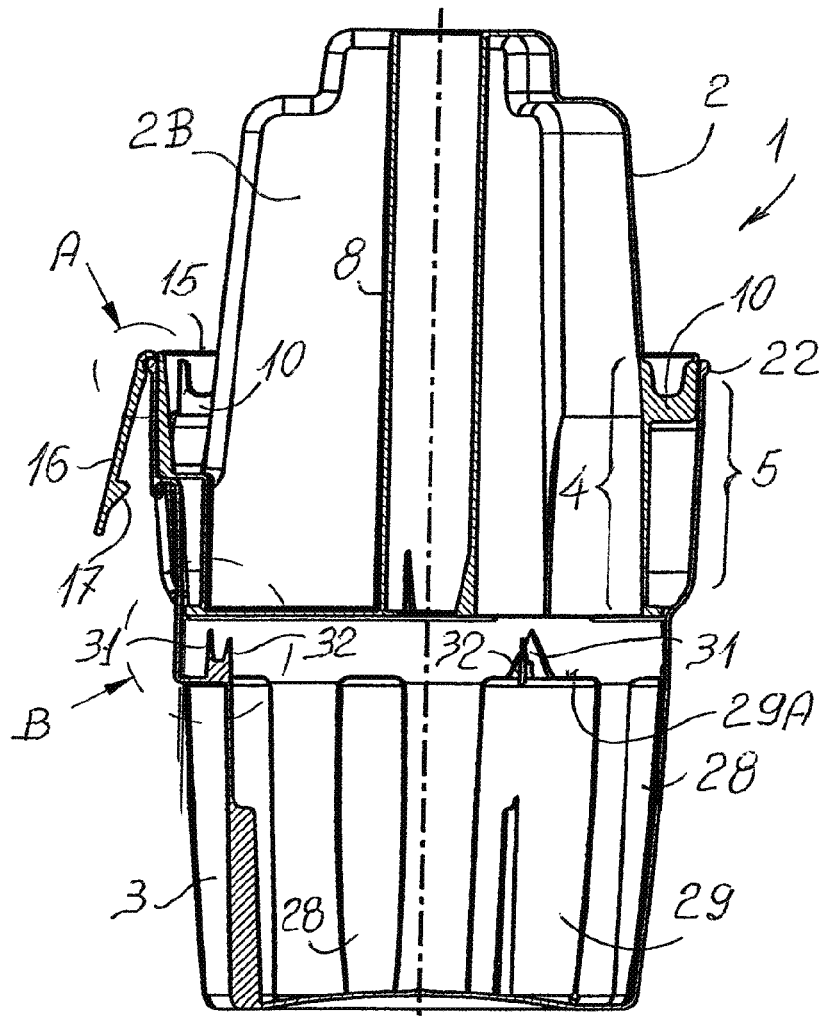
FIG. 1 shows a median vertical section along a disposable shaker 1 according to the invention in a first embodiment with a multi-compartment 2B for the cocktail ingredients is provided for in the upper cover part 2 of the shaker 1.

As observable from FIG. 1, the cover 2 has a lower "piston-like" part 4 which, during assembly, is inserted into the upper "cylinder-like" part 5 of the cup 3. Actually, this configuration was already conceptually illustrated in the abovementioned publication WO2009/104099 A2.

However, contrary to the solid thin separation walls forming the multi-compartment container illustrated in said publication WO2009/104099 A2 which lead to the disadvantages mentioned in the introduction, according to the present invention the separation walls 6, forming—in the illustrated example—a multi-compartment 2B having three compartments 7 for an equivalent number of components or liquors for the cocktail in question, are obtained in form of radial hollow walls and having a U-shaped transverse section open outwards, i.e. laterally and upwards, wherein each wall 6 is thus formed by two opposite walls 6A, 6B joined by the transverse strip 6C connecting said two walls or wings 6A, 6B into a single piece, and forming the U-shaped bottom. The radially internal side of the hollow walls 6 is joined in a single piece to an axial through duct 8.

Figure 5:
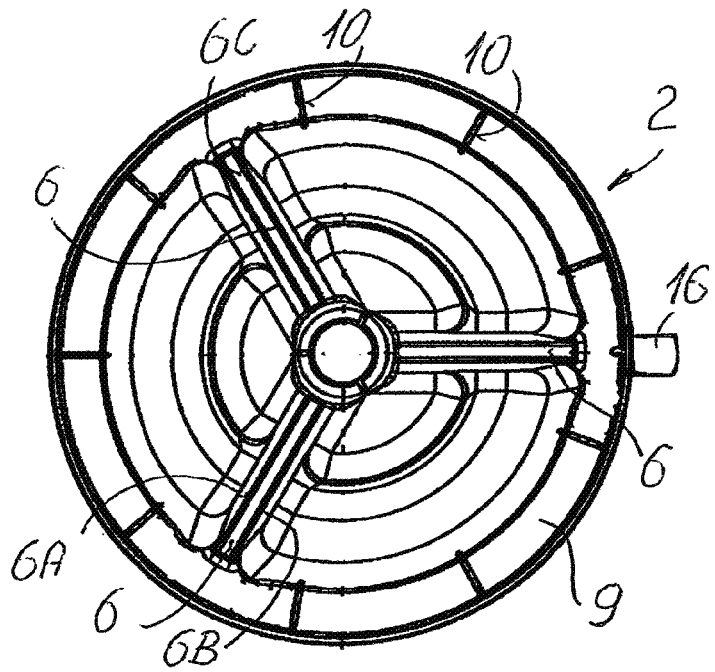
FIGS. 5 and 5A respectively show a top and bottom view of the cover of FIG. 1.
Figure 5A:
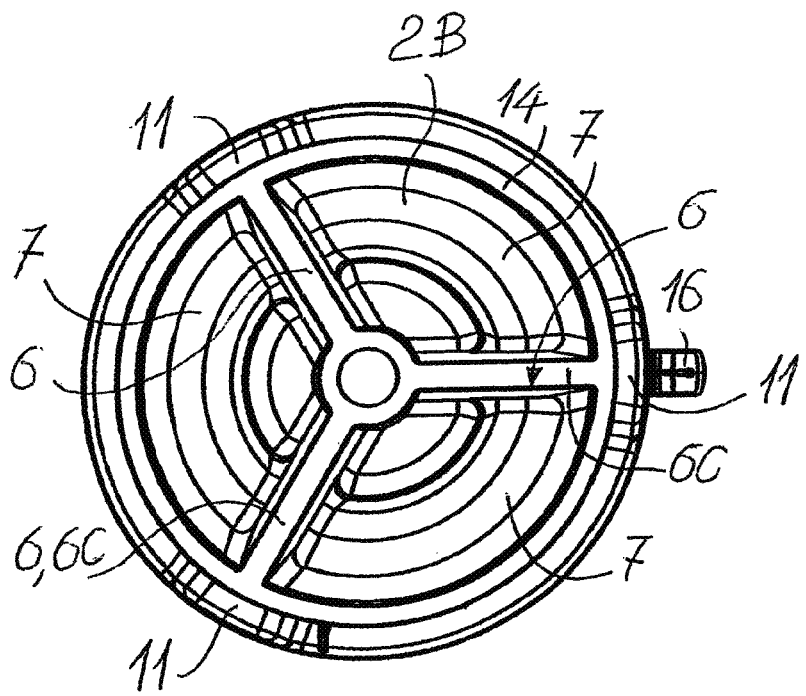
Figure 6:
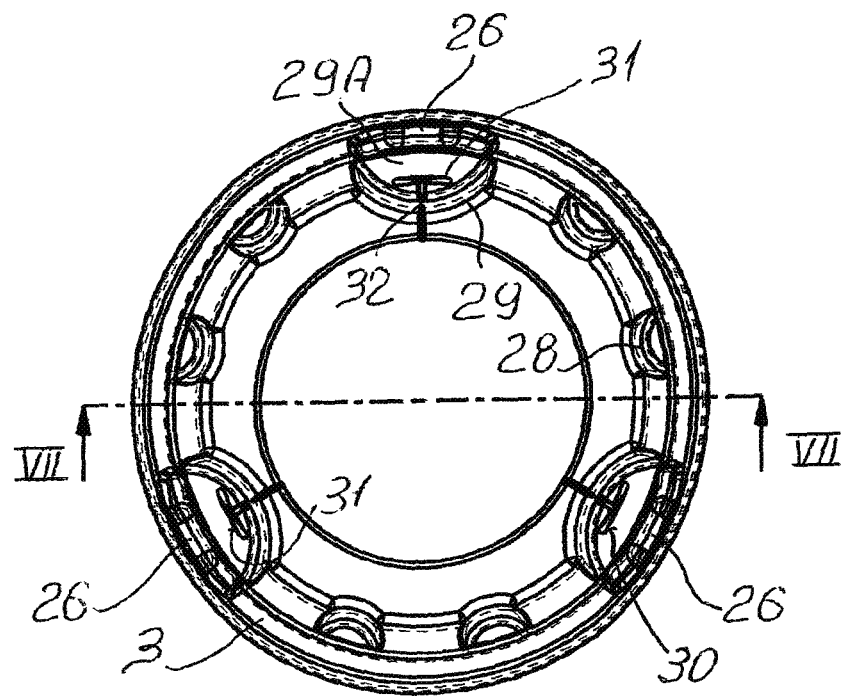
FIG. 6 shows a top view of the cup of the shaker illustrated in FIG. 1.

With the aim of maintaining the wall of the cover 2 thinnest possible, an optimum stiffening of the same is obtained by providing for the U-shaped outer annular flange-like groove 9 with a plurality of circumferentially distributed stiffening bridges 10, FIGS. 1 and 5.

Figure 4:
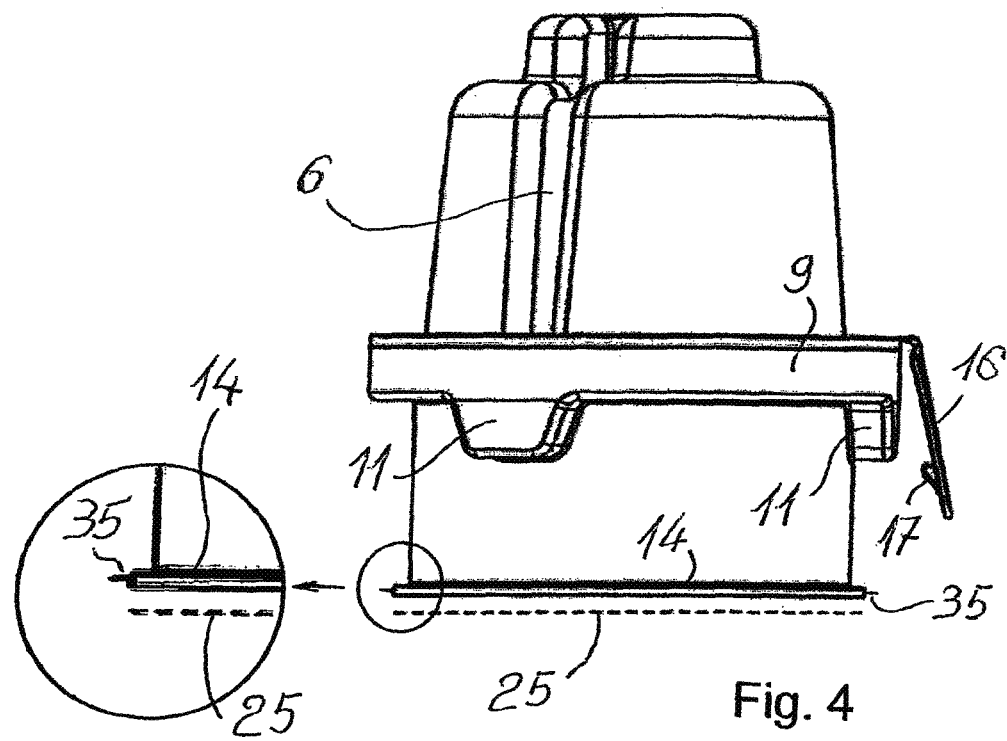
FIGS. 4 and 4A show two front elevational views of the cover in a 180° rotation position with respect to FIG. 1 and illustrating the use of the membrane made of synthetic material or aluminium having an outer diameter slightly smaller or equivalent to the outer diameter of the crown for fixing the membrane, FIG. 4, whose enlarged detail shows that the crown is moulded having—at the end thereof—an annular and flexible projecting lip, or, in FIG. 4A, it shows the use of membranes made of aluminium or synthetic material having a diameter slightly larger than the diameter of said crown for fixing the membrane, wherein the respective enlargement shows that the same membrane is folded backwards forming a sealing lip.
Figure 4A:
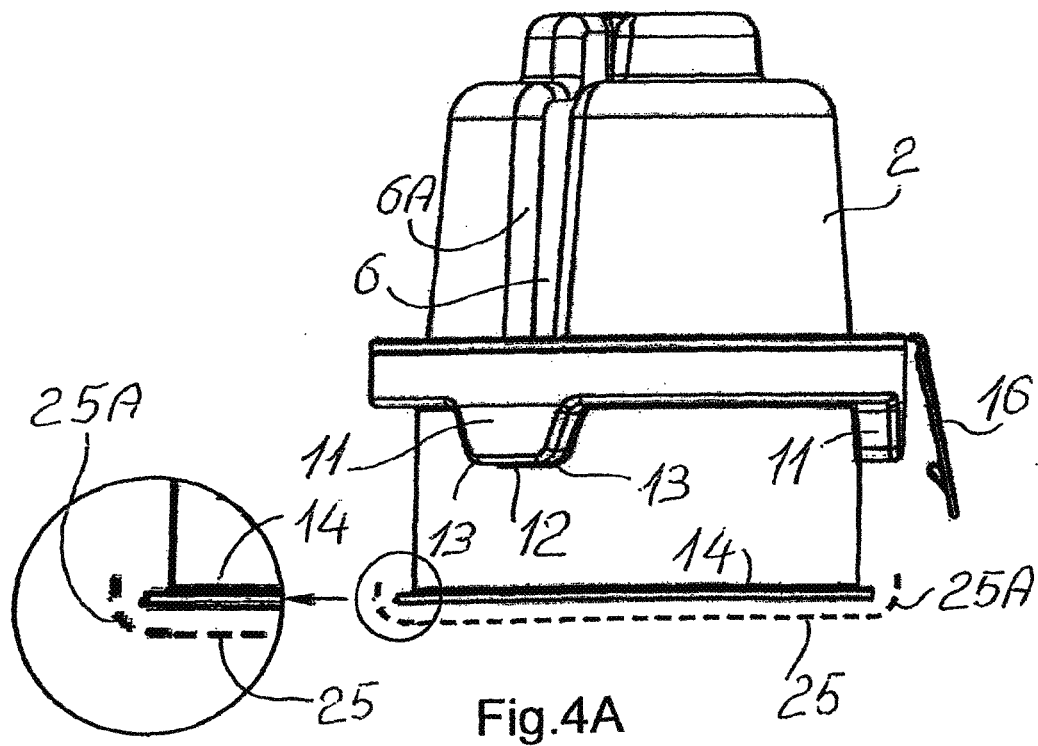

As observable in particular from FIGS. 4 and 4A, provided for on the lower edge of the annular flange-like groove 9 is a plurality of relatively long support projections 11 directed downwards and having, in the illustrated example, a trapezoidal configuration with a lower sliding side 12 and rounded corners 13. The abovementioned "piston-shaped" part 4, ends—at the lower part—with an annular crown 14, converging into which are the mentioned bottom sides 6C of the hollow walls 6. Furthermore, the figures show that projecting—in a single piece—from the upper edge 15 of the abovementioned annular flange-like groove 9 is an oscillable tab 16 directed downwards and having—on the inner side—a tooth 17 for snap-engagement into a seat 18 provided for in the cup 3, FIG. 10.

Figure 2:
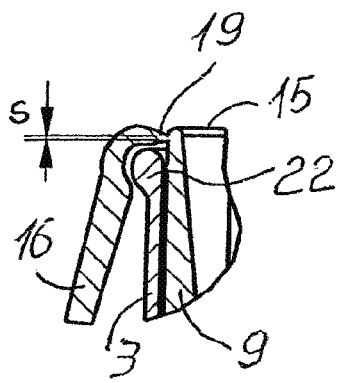
FIG. 2 shows, in enlarged scale, the detail A of FIG. 1.

As observable from FIG. 2, the tab 16 is joined to the edge of the annular flange-like groove 9 by means of a film hinge portion 19 of low thickness s.

Figure 4B:
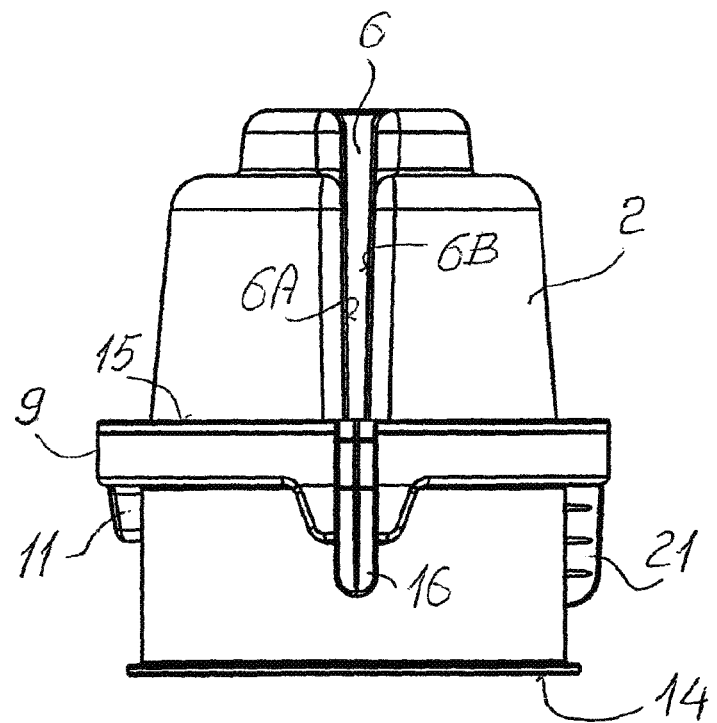
FIG. 4B shows a elevational front view of the cover at a 90° rotation position with respect to FIG. 1.

Indicated with 21, FIG. 4B, in the cover 2 is a longitudinal strip suitable to cooperate with one of the projections 26 (FIGS. 7 and 8) provided for inside the cup 3 to allow mutual rotation between the cover 2 and the cup 3 in only one direction of rotation, for example clockwise, wherein said projections 26 serve another function as illustrated hereinafter.

Figure 7:
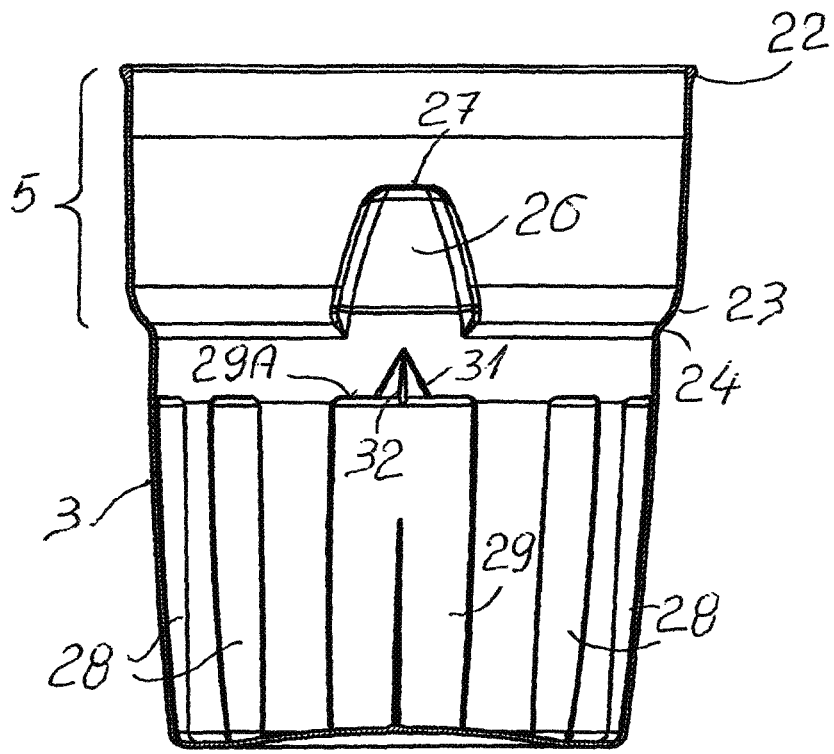
FIG. 7 shows a median vertical section according to plane VII-VII in FIG. 6.
Figure 8:
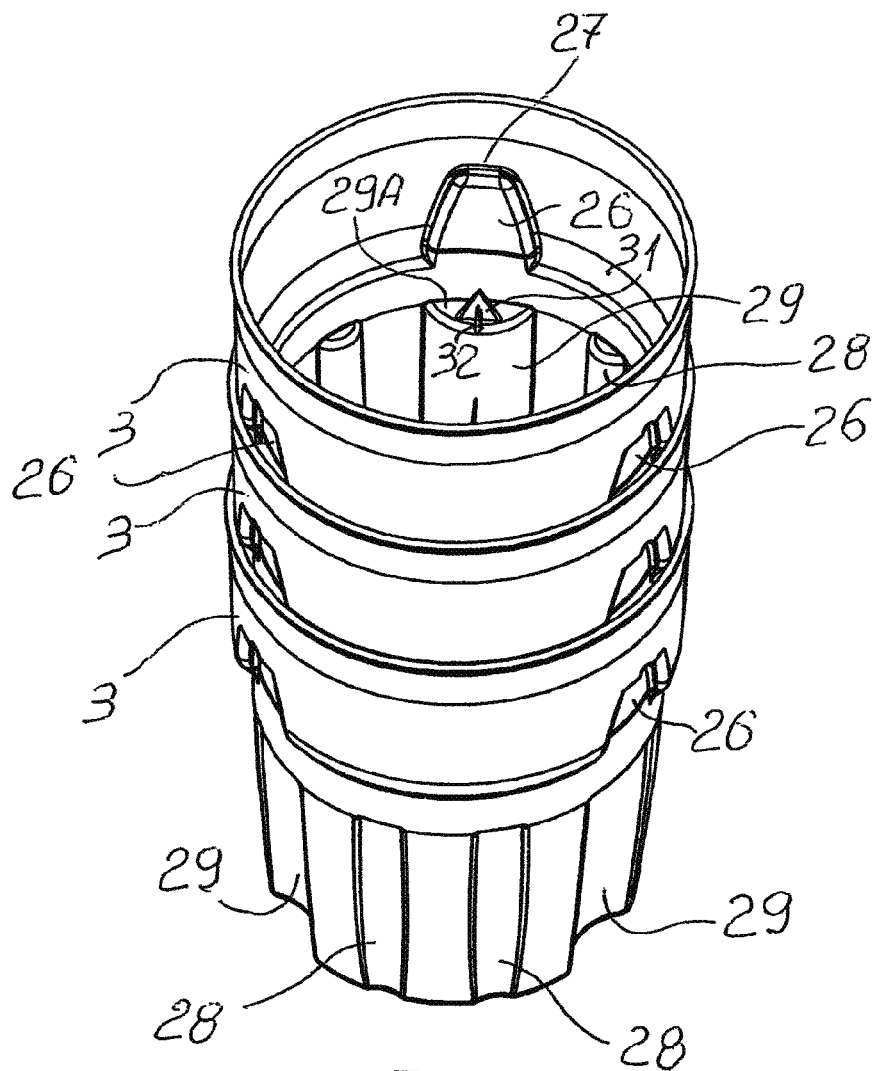
FIG. 8 shows a top oblique perspective view illustrating three lower cup of FIG. 1 stacked over each other.

The cup 3 has—at the higher part—the abovementioned "cylindrical-shaped" band 5, FIG. 7, which ends—at the upper part—with a rounded and slightly enlarged edge 22 to allow a comfortable contact with the lips while drinking, and—at the lower part—it has a connection area 23 on whose lower edge 24 the annular crown 14 with membrane 25 fixed thereto rests when assembling the shaker.

Figure 3:
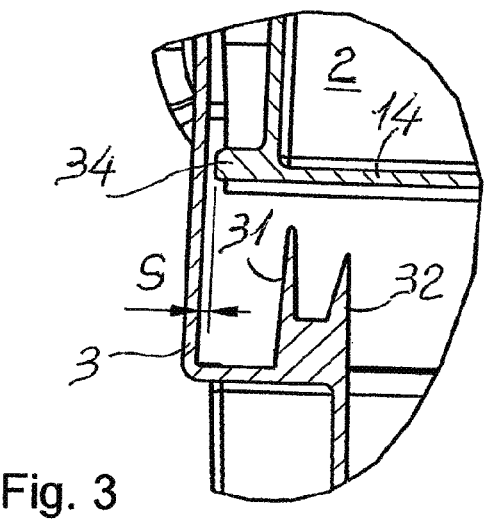
FIG. 3 shows in enlarged scale the detail B of FIG. 1.

As observable in particular from FIG. 3, the annular crown 14 has a thicker circumferential edge 34 and having a slight clearance S with respect to the inner diameter of the cup 3 in the upper part 5 thereof.

The membrane 25, made of synthetic material or aluminium, may have an outer diameter substantially identical to the outer diameter of the crown 14, FIG. 4, or a larger diameter, FIG. 4A. The membranes 25 are indicated with a dashed line, still at a distance from the cover 2, in FIGS. 4 and 4A. In the case of FIG. 4 in order to guarantee an additional sealing action, obtained—during moulding in the perimeter thickness 34 of the crown 14 on the outer edge—is a thin flexible circumferential lip 35 which—during assembly—lies against the inner wall of the cup 3, is bent upwards and executes said additional sealing action. With membranes 25 of larger diameter, FIG. 4A, the crown 14 does not require the lip 35 in that the additional sealing action is obtained by the upward bending of the projecting edge 25 of the membrane itself.

Turning back to the cup 3, FIGS. 6, 7, 8 and 10, provided for in the "cylindrical-shaped" band 5 are the abovementioned projections 26 cooperating with the projections 11 of the cover 2 and having the support and sliding purposes and which are provided for being relatively long and, in the illustrated example, trapezoidal. They project inwards and their upper side 27 forms the support and sliding side, lying on which—from time to time—is the lower support and sliding side 12 of the support and sliding projections 11 of the cover 2. Provided for beneath the connection band 23 in the cup 3 is a plurality of narrower 28 and wider 29 longitudinal peripheral ribs, projecting inwards for stiffening purposes. The wider ribs 29 found beneath the support and sliding projections 25 on the upper or head side 29A thereof respectively have at least one tearing tooth 30.

According to the invention in this embodiment preferably provided for are double tearing teeth 30, i.e. having an cutting and tearing blade part 31, as well as a tip 32 for widening the tearing, guaranteeing a wide tearing and thus a quick and complete dropping of the component of the cocktail into the underlying cup 3 during the tearing rotation. Such configuration of the double tooth 30 with the abovementioned double function may be obtained through other methods at will.

In the assembled position of the shaker 1, FIG. 1, the tips of the teeth 30 are positioned close to the membrane 25. This allows, as known, a quick perforation of the membrane 25 for the preparation of the cocktail.

With the shaker illustrated in FIGS. 1 to 8 in practice after the manual unlocking of the tab 16, through a traction action on the same outwards, the cover 2 and the cup 3 safely lie on each other with the trapezoidal projections 11 and 26 thereof. By performing a slight rotational movement between the cover 2 and the cup 3 the sides 12 and 27 of said positioning projections 11 and 26 shall slide on each other until—upon disengagement thereof—the cover 2 may be lowered axially forcefully onto the cup 3 simultaneously perforating the membrane 25 and subsequently tearing said membrane 25 through progressive mutual rotation between the cover 2 and the cup 3. After the ingredients of the cocktail drop into the cup 3 and after shaking, the shaker may be opened 1 to drink the cocktail from the cup 3, by simple removing of the cover 2 from the cup 3.

Such rotation shall be performed in the desired direction, in which the strip 21 may be free to slide between the projection 26 adjacent thereto and the subsequent one.

With the shaker according to FIG. 1 the cocktail may however be drank by means of a straw, not illustrated, introduced through the axial duct 8 of the cover 2, the central part of the membrane 25 which closes said duct 8 at the lower part being easy to perforate using said straw.

According to the invention the cocktail may also be drank, prepared as illustrated above, without the possibility to open the shaker, as obtainable through the embodiment illustrated in FIGS. 9 and 10. As mentioned above, this embodiment is different from the shaker illustrated in FIGS. 1 to 8 solely due to the fact that it has an upper edge 22 of the cup 3 having a plurality of locking elements in form, in the illustrated example, of hook-like circumferential segments 36 formed by circumferential lips curved inwards to approximately obtain a C-shape. When inserting the cover 2 into the cup 3, i.e. when assembling the shaker, these hook elements 36 elastically divert outwards and, upon completion of the assembly, they are snap-repositioned inwards and are arranged over said upper edge 15 of the abovementioned annular flange-like groove 9 and thus prevent an axial separation between said cover 2 and the cup 3. The size of these hook-like segments 36 shall however be such to allow a free relative rotation between the cover 2 and the cup 3 to tear the membrane.

Figure 13:
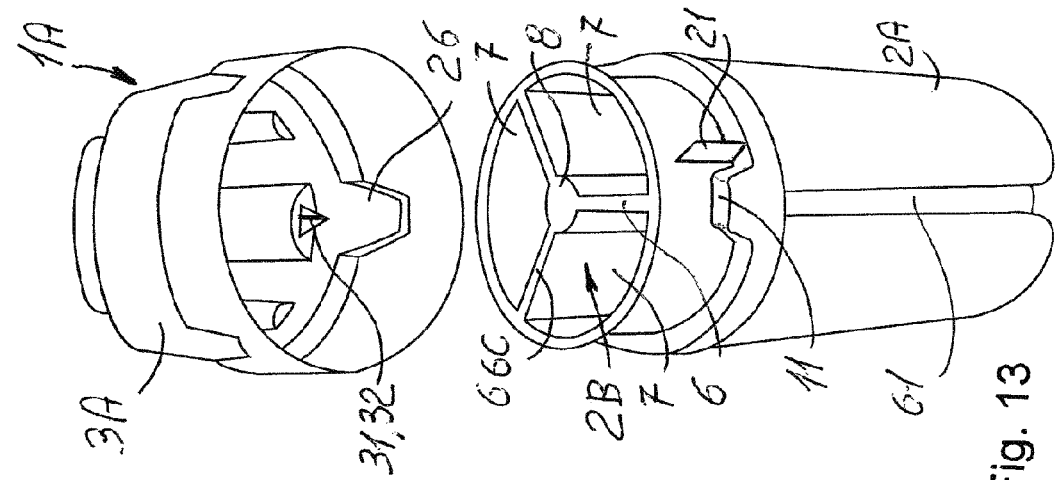
FIGS. 11, 12 and 13 show a further variant of a shaker according to the invention, and more precisely in a front elevational view with the shaker closed in FIG. 11, in a front elevational view with the cover removed in FIG. 12, and in a perspective view with the cover removed in FIG. 13, wherein said container having several compartments or multi-compartment is provided for in the lower cup part of the shaker and said tearing teeth are provided for in the upper cover part.
Figure 11:
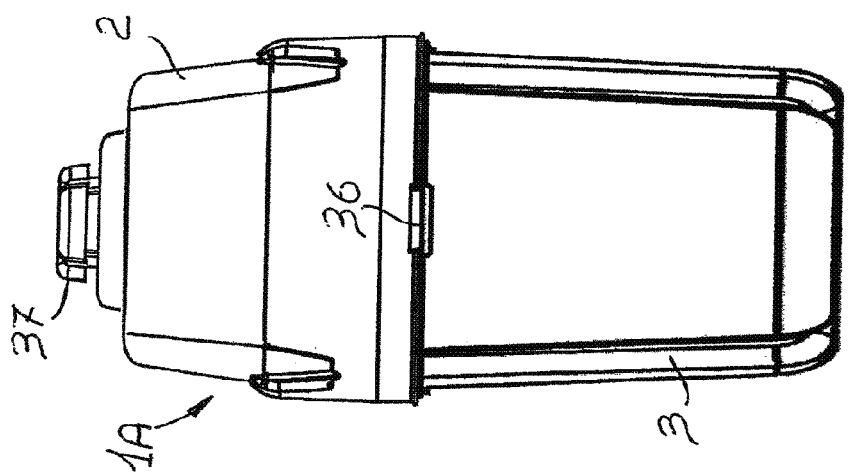
Figure 12:
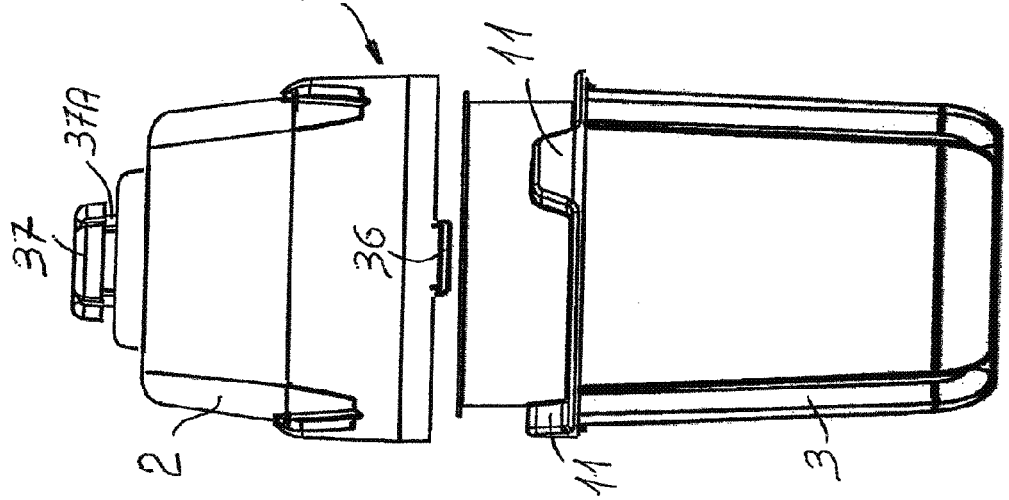
Figure 26:
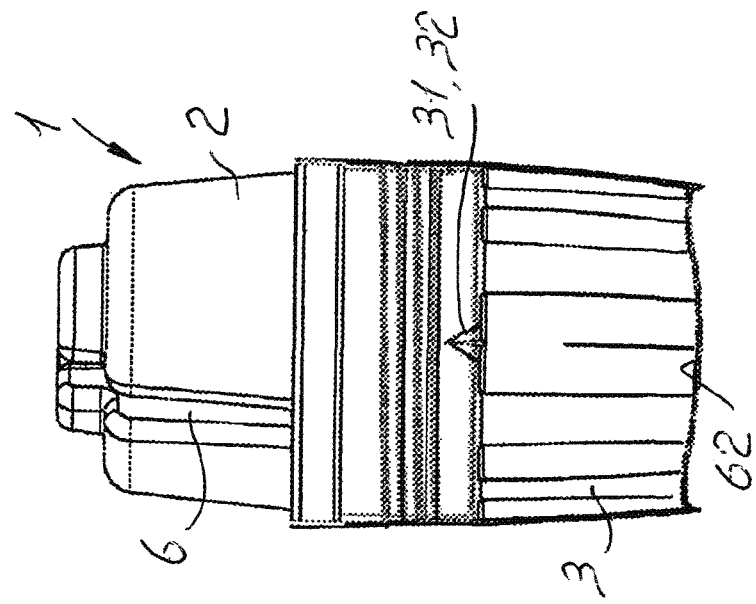
FIG. 26 illustrates a median vertical section of the shaker of FIG. 25 with a bottom 62 centrally concave to facilitate the complete drawing of the cocktail or beverage through a straw, not illustrated, insertable from the top through the axial pipe 8 of the upper part of the shaker and axially movable, FIG. 1.
Figure 15:
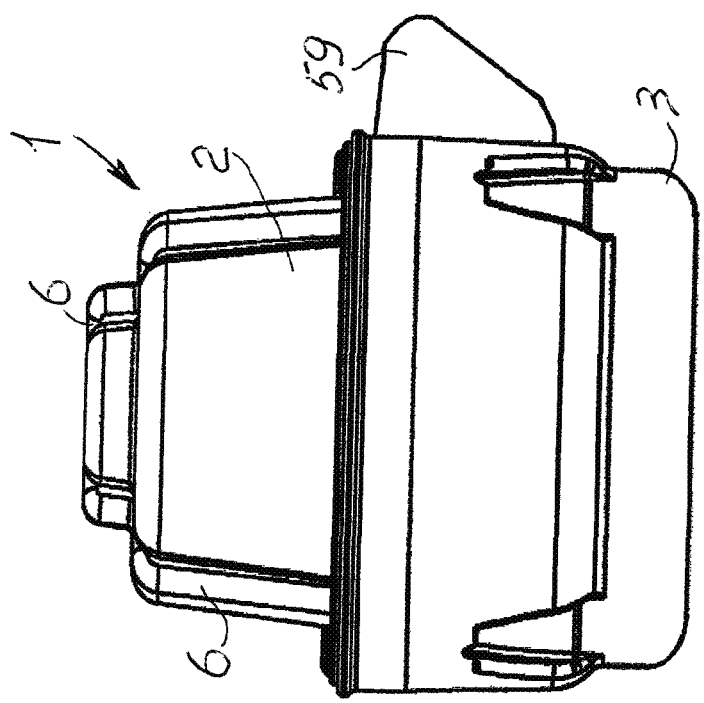
FIG. 15 shows a front view of a shaker of the type illustrated in the FIGS. 1 to 8 in the form and size of a coffee or tea cup with handle 59.
Figure 16:
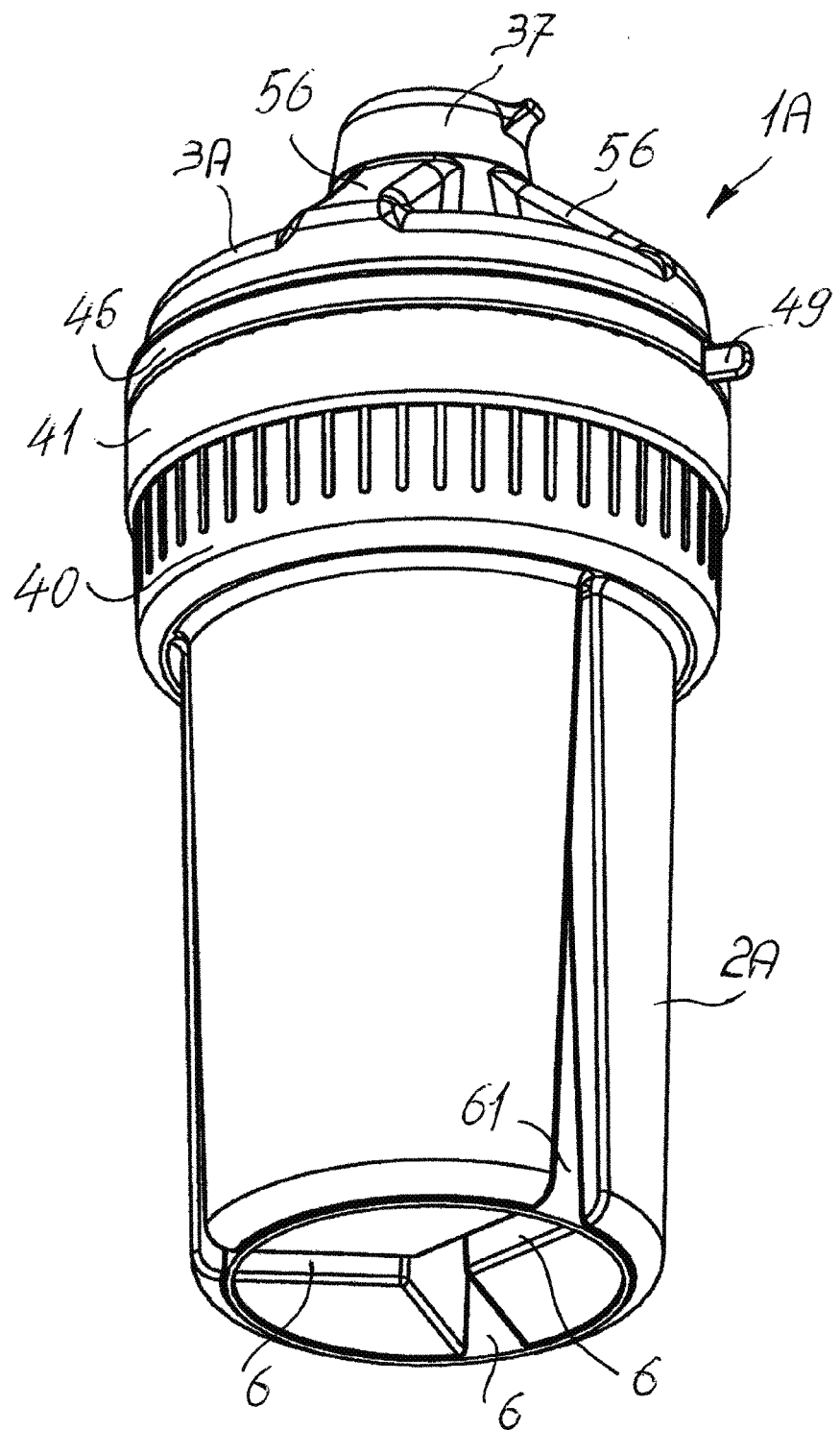
FIG. 16 shows a slightly inclined bottom perspective view of a shaker of the type of the FIGS. 11 to 13 with a new execution of coupling, positioning and locking means between the upper cover part and lower cup or container part and comprising, on the upper part of the container, a removable spacer band, circumferentially notched in a saw-teeth-like manner on the upper edge thereof and joined—at the lower part—to the cup or container part through a tearable circumferential weakening line and equally saw-teeth like, beneath which said cup or container has an internal threading suitable to be engaged with an external threading provided for on the cover part.

The teaching of the present invention also includes inverting the inner structures of the cover 2 and cup 3 hence obtaining a shaker 1A with an upper part having an inner structure of a cup and a lower part having the inner structure of a cover, as illustrated in FIGS. 11 to 13, i.e. the separation walls 6 forming the multi-compartment 2B with the central duct 8 are now provided for in the lower cup part 2A of the shaker 1A while the tearing teeth 31, 32 are provided for in the upper cover part 3A.

The longitudinal strip 21 cooperating with a support and sliding projection 26 to tear the membrane in only one direction of rotation is now observable on the lower cup part 2A of the shaker 1A, FIG. 13.

FIGS. 11 and 12 show that also the "overturned" shaker 1A of FIG. 13 may have the elastic peripheral locking segments 36 to prevent opening thereof after having prepared the cocktail.

Furthermore, FIGS. 11 and 12 also show that the shaker 1A is provided—at the upper part—with a threaded union or connection 37A which is adapted to house a cap or plug 37 of a known type, for example of the push-pull type, which allows sipping, even at different times, the content of the shaker 1A, which latter may thus be conceived similar to a "bidon" used by cyclists and sportsmen. The description outlined above is equally valid for the shaker 1 illustrated in FIGS. 11, 12 and 13, of the type analogous to that illustrated in FIG. 1.

Figures 14, 14A:
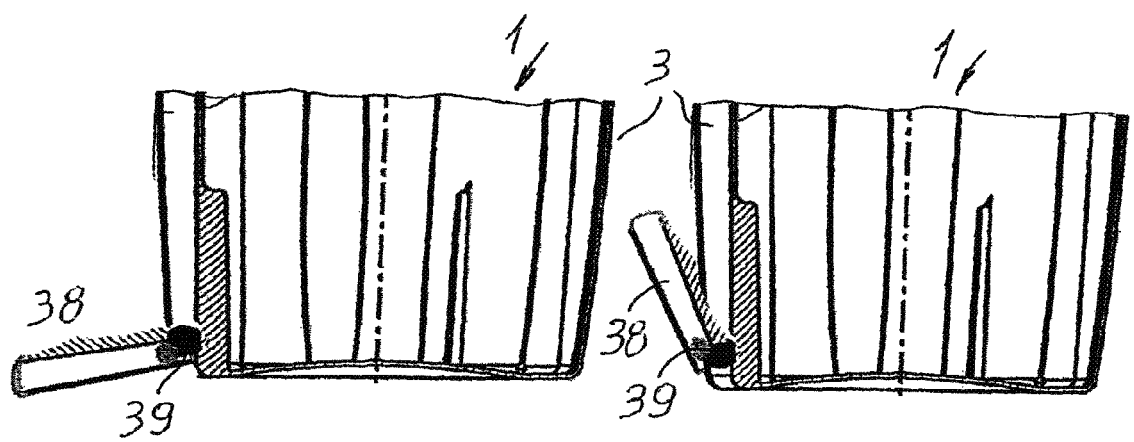
FIGS. 14 and 14A show a detail illustrating an oscillable duct-like discharging element provided for in proximity to the bottom of the shaker, so as to allow pouring the prepared cocktail from the same into a glass, and more precisely when beginning to open, in FIG. 14, and upon completing opening, in FIG. 14A.

Lastly, as illustrated in FIGS. 14 and 14A according to the present invention in the shaker 1 according to FIGS. 1 to 10 is provided for the possibility—additional or alternative—of pouring the contents of the shaker into a glass directly from the shaker bottom, for example by means of a duct-like element 38 sealingly oscillable around a point of rotation 39 provided in proximity to the bottom of the shaker 1.

Reference is now made to FIGS. 16 to 22 which illustrate further embodiments of a shaker 1A of the "overturned" type i.e. according to FIGS. 11 to 13 but with different positioning and locking means.

Figure 17:
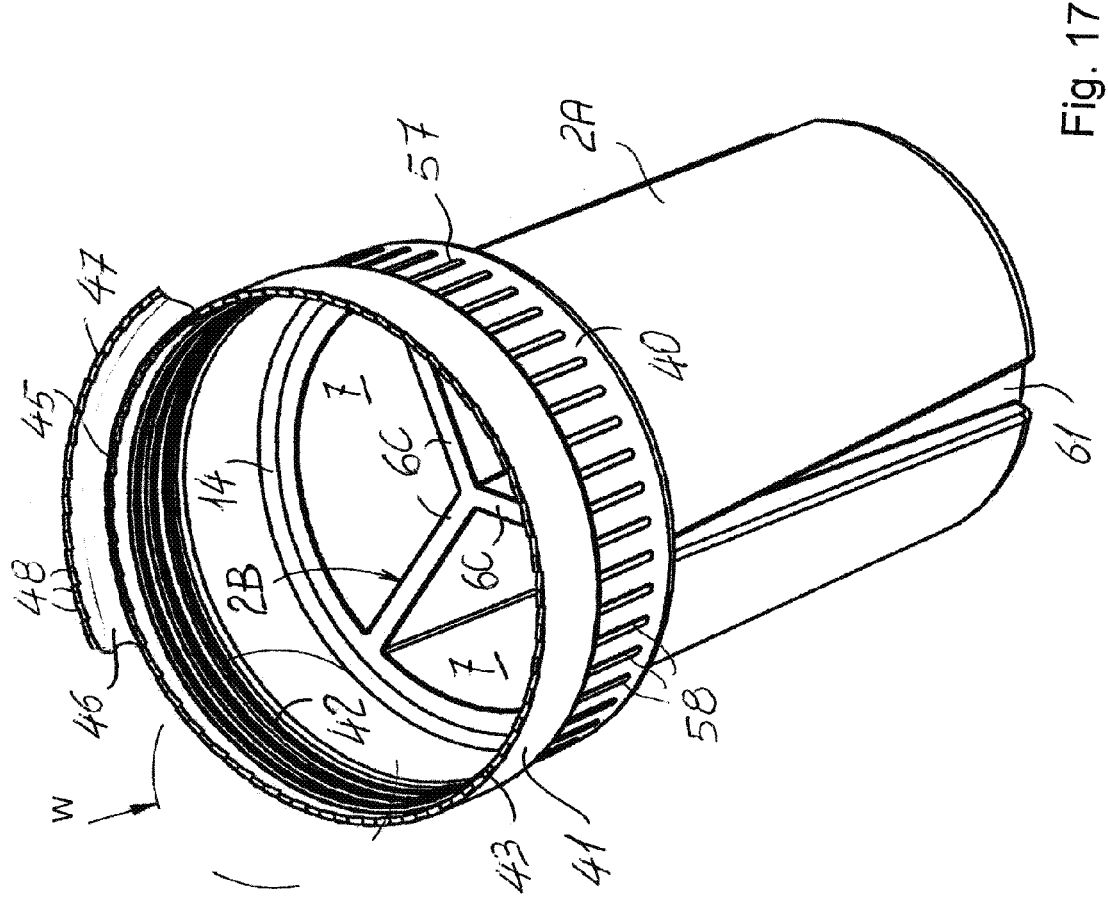
FIG. 17 shows a slightly inclined top perspective view on the lower cup part, observable on which is the upper threaded band of the container with a saw-teeth-like notched edge after removing the tearable spacer band and a portion of the latter with an upper edge also saw-teeth-like notched.
Figure 17A:
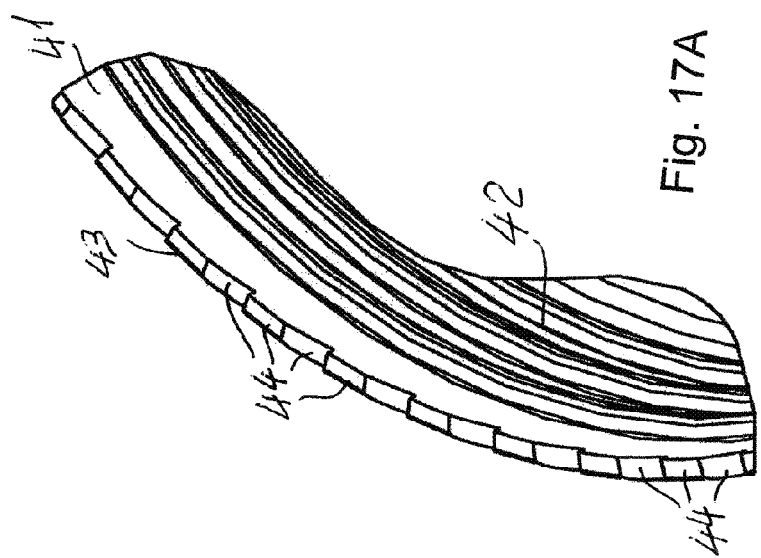
FIG. 17A illustrates—in enlarged scale—the detail W of FIG. 17.

As observable from FIG. 17, the multi-compartment element 2B with several compartments 7 is obtained in the lower container part 2A, which has—at the upper part—a first cylindrical part 40 which develops to form a second cylindrical part 41, having a slightly larger diameter, having an internal threading 42 above which it develops to form a removable circumferential spacer band 46 having the upper edge 43 having a notched circumferential configuration, for example saw-teeth-like 44. This removable band 46 is joined—at the lower part—to said second part 41 through a circumferential weakening line 45 which is similarly configured in a notched manner so as to leave, after tear-removal thereof, the upper edge 43 of said second band 41 having a notched shape, for example saw-teeth-like 44, as illustrated in FIG. 17. As explained hereinafter, this removable spacer band 46 serves to provide alternative positioning means between the upper part 3A and lower part 2A and said removable band has a grip tab 49 for tear-removal thereof, FIG. 16.

Figure 21:
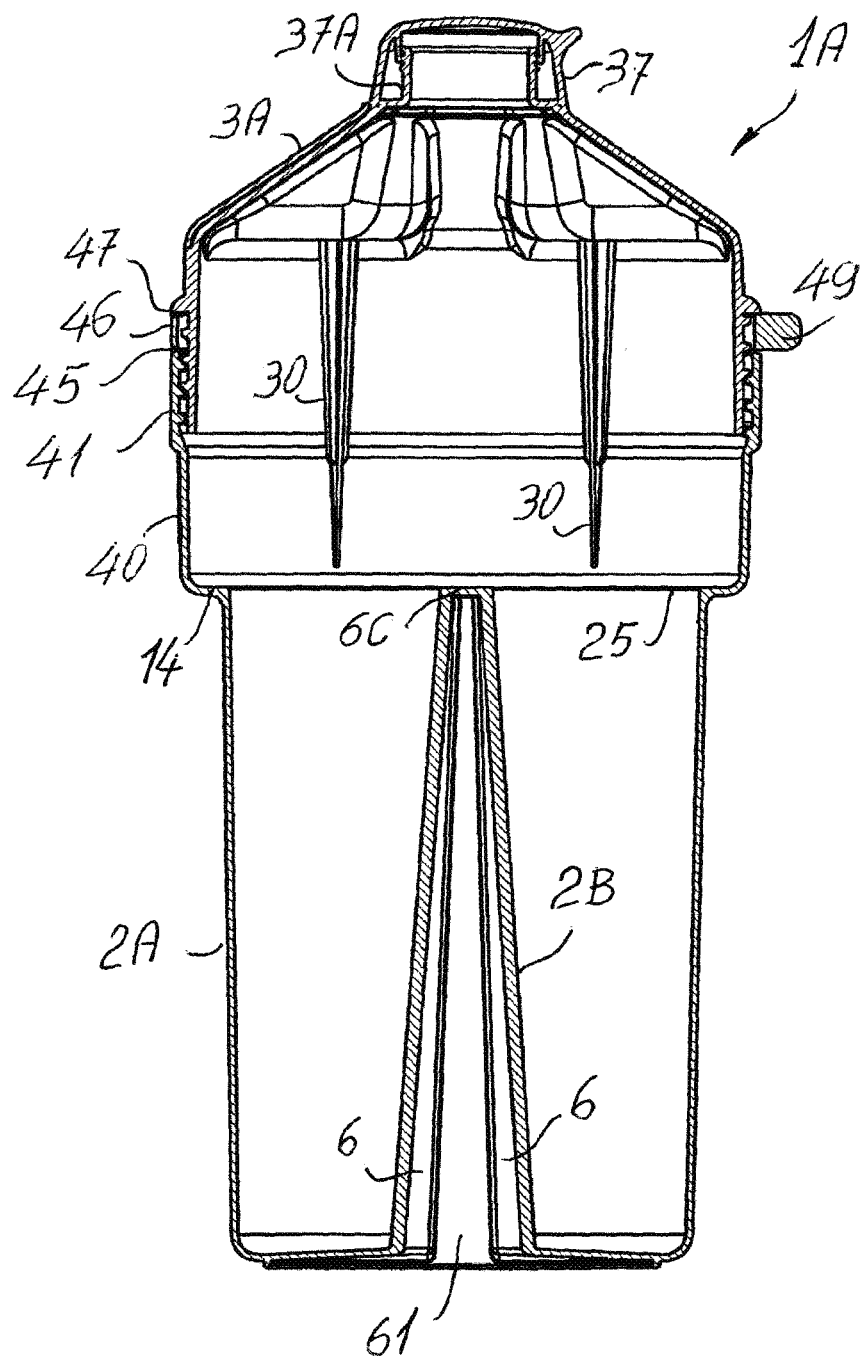
FIG. 21 shows a median vertical section through the shaker of FIG. 16 with an upper cover part and lower container part in the assembled condition, i.e. before the perforation of the membrane and with the plug closed.
Figure 22:
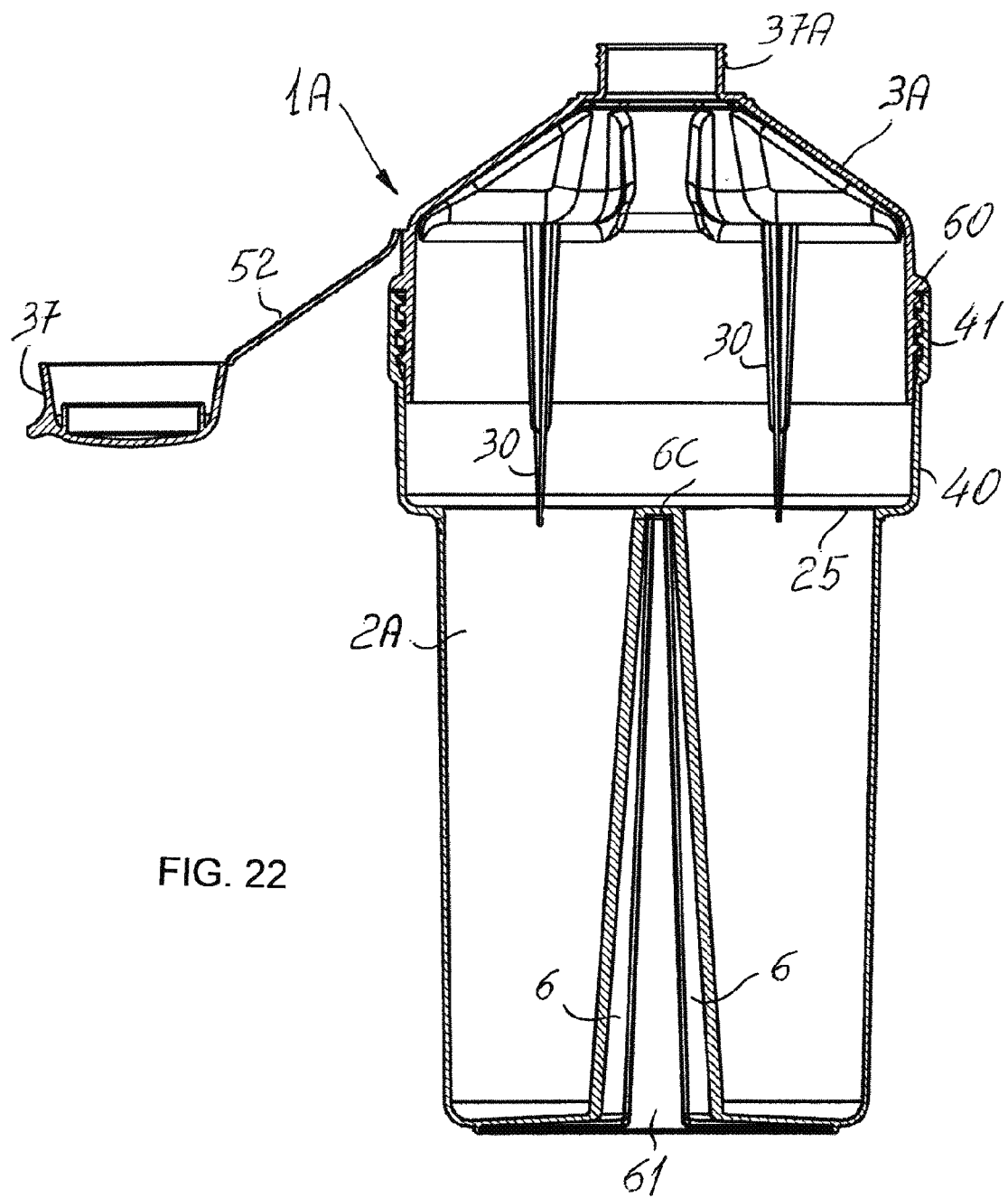
FIG. 22 shows a vertical section analogous to that of FIG. 21, with the plug removed, i.e. after removing the removable spacer band and screwing a bottom of the cover part into the lower cup or container part, with ensuing perforation/tearing of the membrane and locking between said cover and container parts following the coupling of the locking teeth of the upper cover part in the saw-teeth of the upper edge of the lower container part, where—after shaking—the cocktail or beverage may be drank from the opening of the cover.

Furthermore, observable from FIG. 17 are the annular crown 14 and the bottoms 6C of the hollow walls 6 on which the membrane 25, FIGS. 21 and 22, is fixed.

The upper cover part 3A illustrated in FIG. 18 is shaped to form a cap having a threaded upper union or connection 37A for housing a known cap or plug 37, for example a push-pull cap, non illustrated, and having a lower cylindrical band 50 having an external threading 51 which is suitable to be engaged in the internal threading 42 in the lower cup part 2A, as illustrated hereinafter. The tearing teeth 30 are extended vertically downwards.

Figure 19A:
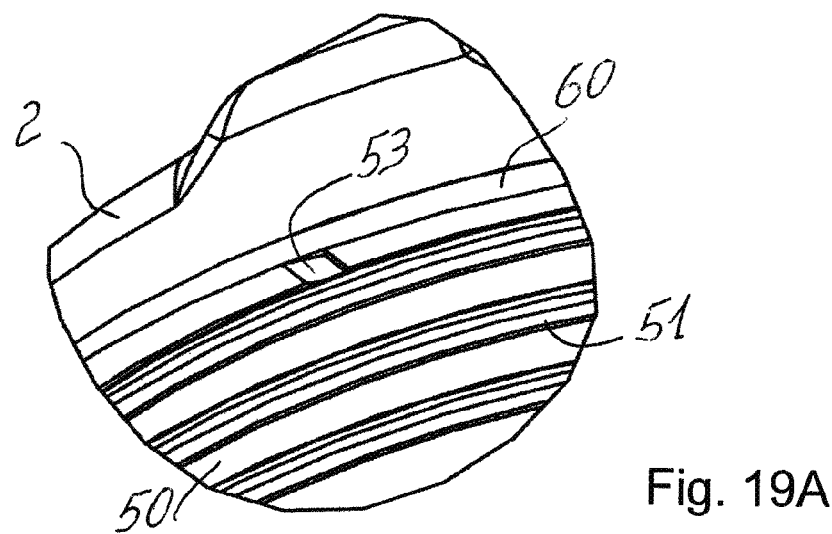
FIG. 19A shows—in enlarged scale—the detail "Y" of FIG. 19 which illustrates a projecting flange-like edge of the upper cover part with one of a plurality of stop teeth, such teeth projecting downwards and being suitable to be engaged first in the saw-teeth of the upper edge of the spacer band and then, after removal of the latter and screwing the cover part in the container part, to be engaged in the saw-teeth formed in the notched upper part of the container part.
Figure 19:
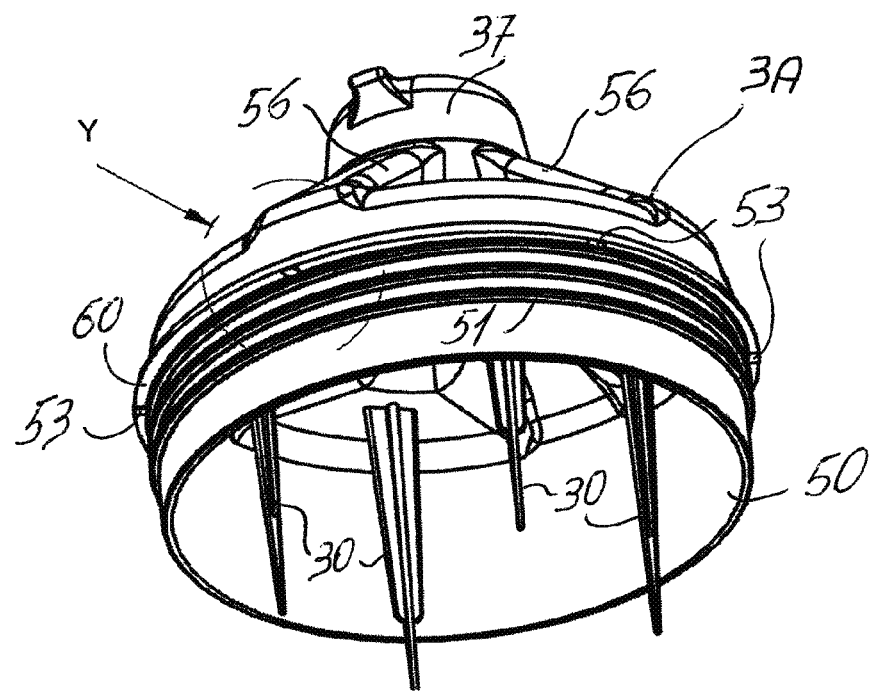
FIG. 19 shows a slightly inclined bottom perspective view of a further upper cover part for receiving a plug moulded in a single piece with the cover itself, with respective cylindrical band having an external threading and the tearing teeth.

Said tearing teeth 30 are further observable from FIG. 19, which illustrates a further cover part 3A having a connection, not observable, for accommodating a cap 37 which is obtained in a single piece with said cover part 3A and is joined to the same by a flexible connection strip 52, FIGS. 20 and 22. Furthermore, observable from FIG. 19, and more clearly from the detail of FIG. 19A thereof, are the locking teeth 53.

While the upper cover part 3A of FIG. 18—to facilitate gripping and rotation—has a crown 54 made of small parallel ribs 55, the upper cover part 3A of FIGS. 19, 20 and 21 has tapered webs 56 between the external circumference of the cover 3A and the connection 37A for the cap 37, facilitating a firm grip with the cover 3A for screwing a bottom of the upper cover part 3A into the lower container part 2A of the shaker for mutual locking thereof.

Analogously, to facilitate gripping and securing thereof, the first cylindrical part 40 of the lower container part 2A has—externally—a crown 57 of parallel ribs 58, FIG. 20.

Regarding the closure plugs 37 provided for is the use of any suitable plug obtained in one or more parts, the plugs also comprising moveable parts and/or a chamber for holding a powder ingredient, or they contain an integrated straw. Such powder component may also be accommodated in the central pipe of the multi-compartment.

Lastly, indicated with 61 are circumferential diaphragms for connecting the opposite walls 6A and 6B of the hollow walls 6, FIGS. 16, 17, 20 and 21, provided for stiffening purposes.

Lastly, reference shall be made to the combined embodiment schematically illustrated in FIGS. 23, 24 and 25 wherein used in a shaker, as illustrated in FIGS. 1-10, are means for positioning and locking as illustrated in FIGS. 16 to 22, to which, alongside the respective descriptions, reference shall be made to avoid repetitions.

The manipulation of the shaker 1A according to FIGS. 16 to 22 is as follows:

Handling for Closure/Packaging

The threading 51 of the cover 3A is performed in such a manner that it allows a first partial coupling with the threading 42 of the lower part or container 2A for, for example, about ½ or more rotation of the cover part 3A with respect to the container 2A during whose rotation the locking notches 53 of the cover 3A start sliding on the saw-teeth 48 of the upper edge of said removable spacer band 46 and then, once through with the rotation, they are stop-engaged with the underlying saw-teeth 48 and thus prevent a respective rotation between the cover 3A and the container 2A both forward and backwards.

In this manner, after filling the compartments 7 of the multi-compartment 2B with the provided ingredients of the cocktail or beverage and fixing of the membrane 25, FIGS. 21 and 22—on the crosspieces 6C of the bottom of the hollow walls 6 and on the annular crown 14 connecting the same— the cover 3A is slightly screwed preliminarily on the container 2A, as illustrated further above, and thus guaranteeing firm positioning between the cover part 3A and the lower container 2A, required before applying the packaging film, not illustrated, on the shaker 1A.

Handling to Prepare a Cocktail or Beverage.

After removing the packaging film, pulling the tab 49 first, there follows the complete removal of the spacer band 46 due to the breaking of the dot-like bridges formed by the circumferential notched weakening line 45 defining the saw-teeth 44 of the upper edge 43 of the lower cup part 2A after the removal of said spacer band 46—FIG. 17—defining the saw-teeth.

In this manner between the projecting edge 60 of the upper cover part 3A having the locking teeth 53 and the notched upper part 43 of the lower cup part 2A is formed a free space which was previously occupied by said removable spacer crown 46 and thus allowing the entirely screwing of the cover part 3A onto the lower cup part 2A, as illustrated in FIG. 22, wherein this axial movement to lower the cover 3A into the cup part 2A and the rotation of said cover 3A allows the tearing teeth 30 to first perforate and then tear the membrane 25. The locking teeth 53 are now engaged in the saw-teeth 44 of the upper edge 43 of the cup part 2A and once again prevent a backwards rotation separation of the cover 3A from the lower cup part 2A.

Thus, the shaker 1A may be shaken and the mixing or shaking of the ingredients of the cocktail, beverage or drink be performed and then said cocktail, beverage or drink may be drank after removing the cap 37, or through a known dispenser plug, not illustrated.

From the above structural and functional description of the improved disposable shakers according to the present invention, it is readily apparent that with said shakers the indicated task is effectively accomplished and the abovementioned advantages are obtained.

In particular, it is observable that the hollow walls 6 provided for separating the single compartments 7 for housing the cocktail ingredients allow obtaining extensive surfaces for fixing the membrane guaranteeing optimal fixing of the membrane resistant even under high storage weights and/or temperatures. It is also equally clear that the snap-positioning tab 16 between the cover and the cup guarantees firm circumferential positioning thereof and a definite positioning of said cover and cup through the support projections 11 and 26. Said projections 11 and 26 are also capable of bearing high compression and pressure stresses, as illustrated above, thus safely preventing triggering tearing. Furthermore, achieved is the important advantage of obtaining lower injection and cooling times and, hence, higher productivity of the machines for moulding the covers and cups.

The disclosures of the invention may also be used advantageously in similar containers, such as for example flat bottles or shakers or the like, as illustrated in the publication WO2009/104099 A2.

In particular, it is further advantageous that the proposed coupling, positioning or locking means 53, 46, 48 and 44 through thread-coupling, FIGS. 16 to 22, also allow safely preventing triggering tearing, simultaneously maintaining the advantages of hollow walls of the multi-compartment 2B.

Likewise, falling within the scope is configuring the proposed shakers by using the various illustrated characteristics combined at will.

Those skilled in the art may introduce various modifications and variants, regarding for example the shape of the perforation and tearing teeth, or other shapes of the stiffening ribs or grooves, or also provide for a different number of compartments for the cocktail ingredients with respect to the one illustrated, or provide for the use of disposable cartridges containing the ingredients of the cocktail desired from time to time and to be introduced into the abovementioned compartments, and so on, without departing from the scope of the invention, as claimed in the appended claims.

The invention claimed is:

1. An improved disposable shaker comprising:
an upper cover part; and
a lower cup part,
the upper cover part and the lower cup part being joinable, removably with respect to each other, with an axial and rotational engagement, the upper cover part forming in a single piece a multi-compartment container with several compartments for separately housing the ingredients of a cocktail to be prepared and sealingly closable at the free end thereof by means of a membrane fixable thereto, wherein teeth for tearing said membrane are provided at an upper part of the lower cup part, the teeth obtained in single piece with the lower cup part and having tearing tips adjacent to said membrane, in the closed or assembled position of the shaker, so that a relative axial and rotation movement between said upper cover part and said lower cup part causes a penetration of said tearing teeth into said membrane, with ensuing tearing of the latter and dropping of the cocktail ingredients from the upper cover part into the lower cup part for mixing thereof or shaking in the shaker, wherein the upper cover part and the lower cup part each have means for mutual support in the assembled position of the shaker, or said teeth are provided in said upper cover part, and said multi-compartment is provided for in said lower cup part, wherein said multi-compartment container comprises separation walls between the compartments of the ingredients of the cocktail said separation walls are substantially U-shaped transverse section hollow walls, open outwards and with the transverse side of the U-shape forming a surface for fixing said membrane, wherein said multicompartment container has a height with a longitudinal axis, and along the longitudinal axis said separation walls are joined into a single piece with an axial duct extended along the height of said multi-compartment container.

2. The shaker according to claim 1, wherein fixed positioning means are provided between the cover and the cup of the shaker in the assembled condition.

3. The shaker according to claim 2, wherein said fixed positioning means are formed by a tab joined in a single piece in a hinge-like manner to an outer edge of the cover, the tab projecting downwards and internally having a tooth-like element suitable to be snap-engaged into a seat obtained outside on the cup part.

4. The shaker according to claim 3, wherein:
said means for mutual support in the upper cover part and in the lower cup part in the assembled condition of the shaker, are provided by quadrangular support and sliding projections with rounded corners and distributed on respective overlapped circumferences,
the upper cover part comprises at said support projections a U-shaped stiffening outer flange-like groove with internal radial reinforcement bridges distributed circumferentially in said flange-like groove, and
the lower cup part has an upper edge that has a plurality of hook-like circumferential segments facing inwards that are configured to yield elastically outwards and then elastically repositioned over an edge of said U-shaped flange-like groove of the cover so that separation between the cover and cup is prevented during rotational movement between the upper cover part and the lower cup part for tearing the membrane when the upper cover part and lower cup part are assembled.

5. The shaker according to claim 2, wherein:
said means for mutual support in the upper cover part and in the lower cup part in the assembled condition of the shaker, are provided by quadrangular support and sliding projections with rounded corners and distributed on respective overlapped circumferences,
the upper cover part comprises at said support projections a U-shaped stiffening outer flange-like groove with internal radial reinforcement bridges distributed circumferentially in said flange-like groove, and
the lower cup part has an upper edge that has a plurality of hook-like circumferential segments facing inwards that are configured to yield elastically outwards and then elastically repositioned over an edge of said U-shaped flange-like groove of the cover so that separation between the cover and cup is prevented during rotational movement between the upper cover part and the lower cup part for tearing the membrane when the upper cover part and lower cup part are assembled.

6. The shaker according to claim 1, wherein said means for mutual support in the upper cover part and in the lower cup part in the assembled condition of the shaker, are provided by quadrangular support and sliding projections with rounded corners and distributed on respective overlapped circumferences, with the shaker assembled, in such a manner to allow proper rotation on the transverse plane between the cover and cup before the tearing of the membrane and a mutual smooth approaching between the cover and cup to perforate the membrane so that the formation of unintentional triggering tearing is prevented.

7. The shaker according to claim 1, wherein the upper cover part is has an axial strip element suitable to cooperate with an abutment in the cup to allow only one direction of rotation between the cover and cup, wherein said abutment in the cup is formed by one of said support and sliding projections.

8. The shaker according to claim 1, wherein the sides of the bottom of the hollow walls are connected to each other by a circular crown, on whose bottoms and circular crown is glued said membrane before assembling the shaker, wherein
a) the membranes have a greater outer diameter with respect to the diameter of said circular crown, the projecting annular part of the membrane during assembly is turned upwards and lies against the inner wall of the cup obtaining an additional sealing action, or
b) the membranes have a diameter substantially equivalent to the diameter of said circular crown, provided for on the outer edge of the circular crown is a thin coplanar and flexible annular lip which during assembly is turned upwards and lies on the inner wall of the cup obtaining an additional sealing action.

9. The shaker according to claim 1, wherein:
said means for mutual support in the upper cover part and in the lower cup part in the assembled condition of the shaker, are provided by quadrangular support and sliding projections with rounded corners and distributed on respective overlapped circumferences,
the upper cover part comprises at said support projections a U-shaped stiffening outer flange-like groove with internal radial reinforcement bridges distributed circumferentially in said flange-like groove, and
the lower cup part has an upper edge that has a plurality of hook-like circumferential segments facing inwards that are configured to yield elastically outwards and then elastically repositioned over an edge of said U-shaped flange-like groove of the cover so that separation between the cover and cup is prevented during rotational movement between the upper cover part and the lower cup part for tearing the membrane when the upper cover part and lower cup part are assembled.

10. The shaker according to claim 1, wherein:
said means for mutual support in the upper cover part and in the lower cup part in the assembled condition of the shaker, are provided by quadrangular support and sliding projections with rounded corners and distributed on respective overlapped circumferences,
the upper cover part comprises at said support projections a U-shaped stiffening outer flange-like groove with internal radial reinforcement bridges distributed circumferentially in said flange-like groove.

11. The shaker according to claim 1, the tearing wherein the teeth for tearing said membrane are are located on an upper side of first outer axial stiffening ribs, wherein interposed outwards between said first ribs are further axial ribs for stiffening the lower cup part.

12. The shaker according to claim 1, wherein:
the upper cover part is dome-shaped with a lower cylindrical band having an external threading, internal tearing teeth directed vertically downwards, an external circumferential edge having locking teeth at a lower part of the upper cover part, and an upper connection for housing a cap or plug, and
the lower cup part has the multi-compartment, closable by the sealing membrane, and the lower cup part, at an upper part, has a first cylindrical gripping band followed by an upper band having a larger diameter and having an internal threading suitable to be engaged with the threading of the upper cover part and said upper band, through a circumferential notched weakening line is joined to a removable spacer band, which has the notched upper edge, the threading of the upper cover part allows, after an initial rotation, movement of said locking teeth of the upper cover part in slidable contact with said upper notched edge of said removable spacer band and, at the end of said rotation, in engagement with said saw-teeth of the upper edge of said removable spacer band a to prevent forward, backward or an axial rotational movement between said upper cover part and the lower cup part so that the shaker is brought in the assembly position for the later application of the packaging wrapper, in that for preparing the cocktail, after removing said wrapper and the removal of the spacer band, the space left by the latter, allows further screwing of the upper cover part into the lower cup part with the ensuing perforation and tearing of the membrane, to allow subsequent shaking of the ingredients of the cocktail or beverage which latter may thus be drunk through the opening or through the plug, and in said multi-compartment, the separation walls between the compartments of the ingredients of the cocktail are hollow walls.

13. The shaker according to claim 12, wherein the hollow walls of the multi-compartment have a U-shaped axial and transverse section which is open downwards and inwards along the longitudinal axis of the lower cup part, and is closed outwards by a segment of a circumferential connection diaphragm, wherein additionally the transverse side of the bottom of the U-shape and the annular crown connecting said bottoms of said hollow walls form the surface for fixing the membrane.

* * * * *